(12) United States Patent
Fu et al.

(10) Patent No.: US 11,334,164 B2
(45) Date of Patent: May 17, 2022

(54) PORTABLE ELECTRONIC DEVICE HAVING A HAPTIC DEVICE WITH A MOVING BATTERY ELEMENT

(71) Applicant: Apple Inc., Cupertino, CA (US)

(72) Inventors: Jody C. Fu, San Francisco, CA (US); Erik G. de Jong, San Francisco, CA (US); Christopher R. Pasma, Mountain View, CA (US); Katharine R. Chemelewski, Campbell, CA (US); Rex T. Ehman, San Jose, CA (US); Brad W. Simeral, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 16/888,094

(22) Filed: May 29, 2020

(65) Prior Publication Data
US 2021/0026450 A1   Jan. 28, 2021

Related U.S. Application Data

(60) Provisional application No. 62/876,879, filed on Jul. 22, 2019.

(51) Int. Cl.
*G06F 3/01* (2006.01)
*G04G 17/04* (2006.01)
*G04G 21/08* (2010.01)
*G06F 3/041* (2006.01)

(52) U.S. Cl.
CPC ............. *G06F 3/016* (2013.01); *G04G 17/04* (2013.01); *G04G 21/08* (2013.01); *G06F 3/041* (2013.01)

(58) Field of Classification Search
CPC ......... G06F 3/016; G06F 3/041; G04G 21/08; G04G 17/04
See application file for complete search history.

(56) References Cited

U.S. PATENT DOCUMENTS

| 6,686,901 B2 | 2/2004 | Rosenberg |
| 6,924,787 B2 | 8/2005 | Kramer et al. |
| 7,307,619 B2 | 12/2007 | Cunningham et al. |
| 7,503,989 B2 | 3/2009 | Picciotto et al. |

(Continued)

FOREIGN PATENT DOCUMENTS

| CN | 1926917 | 3/2007 |
| CN | 101427393 | 5/2009 |

(Continued)

*Primary Examiner* — Alexander Eisen
*Assistant Examiner* — Kebede T Teshome
(74) *Attorney, Agent, or Firm* — Brownstein Hyatt Farber Schreck, LLP

(57) ABSTRACT

An electronic device includes an enclosure having a transparent cover defining a touch-sensitive surface, a display positioned within the enclosure and below the transparent cover, and a haptic device configured to produce a haptic output along the touch-sensitive surface. The haptic device may include a battery element electrically coupled to the display, a magnetic element, and a coil assembly fixed with respect to the enclosure and configured to induce an oscillatory movement of the battery element parallel to the display to produce the haptic output. In other examples, the coil assembly may be coupled to the battery element and the first and second magnetic elements may be fixed with respect to the enclosure.

20 Claims, 23 Drawing Sheets

(56) References Cited

U.S. PATENT DOCUMENTS

| | | |
|---|---|---|
| 7,860,259 B2 | 12/2010 | Onishi et al. |
| 8,310,444 B2 | 11/2012 | Peterson et al. |
| 8,436,825 B2 | 5/2013 | Coni et al. |
| 8,717,151 B2 | 5/2014 | Forutanpour et al. |
| 8,878,655 B2 | 11/2014 | Sormunen |
| 9,054,605 B2 | 6/2015 | Jung et al. |
| 9,246,551 B2 | 1/2016 | Yeo et al. |
| 9,949,784 B2 | 4/2018 | Cohen |
| 10,164,688 B2 | 12/2018 | Rothkopf et al. |
| 10,599,101 B2 | 3/2020 | Rothkopf et al. |
| 10,603,690 B2 | 3/2020 | Zadesky et al. |
| 2011/0276878 A1* | 11/2011 | Sormunen ........... G06F 3/03547 715/702 |
| 2014/0043053 A1 | 2/2014 | Huber et al. |
| 2014/0197936 A1* | 7/2014 | Biggs ....................... G08B 6/00 340/407.1 |
| 2016/0058375 A1* | 3/2016 | Rothkopf ................ G06F 3/015 600/301 |
| 2018/0101141 A1* | 4/2018 | Lagorgette .............. G04C 3/101 |
| 2018/0233856 A1 | 8/2018 | Brandwijk |
| 2020/0215574 A1 | 7/2020 | Zadesky et al. |

FOREIGN PATENT DOCUMENTS

| | | |
|---|---|---|
| CN | 102460938 | 5/2012 |
| CN | 102648860 | 8/2012 |
| EP | 1544720 | 6/2005 |
| JP | 2000269563 | 9/2000 |
| KR | 1020050038645 | 4/2005 |
| KR | 20130005715 | 1/2013 |
| WO | WO 12/169138 | 12/2012 |

* cited by examiner

PORTABLE ELECTRONIC DEVICE HAVING A HAPTIC DEVICE WITH A MOVING BATTERY ELEMENT

CROSS REFERENCE TO RELATED APPLICATION(S)

This application is a non-provisional application that claims priority to U.S. Provisional Patent Application No. 62/876,879, filed Jul. 22, 2019, and titled "Haptic Devices that Move Battery Elements," the disclosure of which is hereby incorporated herein by reference in its entirety.

FIELD

The described embodiments relate generally to electronic devices having a haptic device. More particularly, the embodiments described herein relate to haptic devices that move a battery element to provide a haptic output.

BACKGROUND

Electronic devices are increasingly common in the modern world. These electronic devices include any of a number of different input or output components for interacting with a user. Traditionally, electronic devices include one or more buttons or electromechanical switches for providing input. However, as devices become smaller, there is less space to integrate traditional button-type input devices. Some devices include a touch sensor or touch screen for receiving input. However touch sensors generally lack the mechanical feedback to alert the user that an input has been registered.

The systems and techniques described herein are directed to a haptic device that may be used to provide tactile feedback to a user during operation of the device. More specifically, the embodiments described herein are directed to a haptic device that moves a battery element in order to produce a tactilely perceptible pulse or vibration along an exterior surface of the device.

SUMMARY

The present disclosure relates to a haptic device that moves a battery element. The haptic device may be included in an electronic device, such as an electronic watch. The haptic device may include the battery element, an actuation mechanism that is operable to move the battery element, a support mechanism that is operable to allow the battery element to move, and a flexible connector that electrically connects the battery element to another component during the movement.

In various embodiments, an electronic watch includes an enclosure having a transparent cover defining a touch-sensitive surface, a display positioned within the enclosure and below the transparent cover, and a haptic device configured to produce a haptic output along the touch-sensitive surface. The haptic device includes a battery element electrically coupled to the display, a magnetic element, and a coil assembly fixed with respect to the enclosure and configured to induce an oscillatory movement of the battery element in a direction that is parallel to at least a portion of the display to produce the haptic output.

In some examples, the battery element defines a first surface and a second surface opposite to the first surface, the magnetic element includes a first magnetic element and a second magnetic element, the magnetic element includes a first magnetic element and a second magnetic element, the first magnetic element is coupled to the battery element along the first surface and positioned between the battery element and the display, the second magnetic element is coupled to the battery element along the second surface, and the coil assembly extends around the battery element, the first magnetic element, and the second magnetic element. In various examples, the magnetic element includes a first magnetic element and a second magnetic element and the battery element extends around at least a portion of the first magnetic element and at least a portion of the second magnetic element. In some examples, the magnetic element is a case of the battery element or the magnetic element is a first magnetic element and a second magnetic element disposed in a cavity defined within the battery element. In a number of examples, the electronic watch further includes a drive circuit, the drive circuit is configured to apply an oscillating current to the coil assembly, and the battery element provides power to the drive circuit to produce the oscillating current.

In various examples, the haptic device further includes a first spring element positioned at a first end of the battery element and configured to produce a first restoring force and a second spring element positioned at a second end of the battery element opposite to the first end and configured to produce a second restoring force opposite to the first restoring force. In a number of implementations of such examples, the electronic watch further includes electronic circuitry having a processing unit, the electronic circuitry is positioned along a side of the battery element that is opposite to the display, and the first spring element includes a flexible circuit element having one or more conductive power traces that electrically couple the battery element to the electronic circuitry.

In some embodiments, an electronic watch includes an enclosure having a transparent cover, a touch-sensitive display positioned within the enclosure and below the transparent cover, and a haptic device configured to produce a haptic output along an exterior surface of the electronic watch. The haptic device includes a battery element electrically coupled to the touch-sensitive display, a first magnetic element fixed with respect to the enclosure, a second magnetic element fixed with respect to the enclosure, and a coil assembly fixed with respect to the battery element and configured to induce an oscillatory movement of the battery element parallel to at least a portion of the touch-sensitive display to produce the haptic output.

In various examples, the electronic watch further includes a drive circuit that is electrically coupled to the battery element and the drive circuit is electrically coupled to the coil assembly and is configured to produce a drive signal that induces the oscillatory movement of the battery element. In some examples, the haptic output is produced in response to touch input detected by the touch-sensitive display and a graphical output of the touch-sensitive display is modified in response to the touch input. In a number of examples, the oscillatory movement produces a vibration that is tactilely perceptible along an outer surface of the transparent cover. In various examples, the oscillatory movement produces an inertial pulse that is tactilely perceptible along an outer surface of the electronic watch. In a number of examples, the electronic watch further includes a circuit assembly positioned along a lower side of the battery element and the haptic device further includes a flexible electrical circuit that electrically connects the battery element to the circuit assembly. In some implementations of such examples, the flexible electrical circuit is attached to a flexure element that is configured to provide a restoring force to the battery element.

In a number of embodiments, an electronic device includes an enclosure having a transparent cover, a touch sensor positioned below the transparent cover and configured to detect touch input along an outer surface of the transparent cover, a display positioned within the enclosure and below the transparent cover, a battery element disposed within the enclosure below the display, an actuation mechanism that is operable to move the battery element along a linear path that is parallel to a portion of the display to provide an inertial output that is tactilely perceptible along the outer surface of the transparent cover and a flexure that deforms in response to movement of the battery element and provides a restorative force to the battery element. The flexure includes a set of conductive traces that electrically connects the battery element to the display during the movement.

In some examples, the electronic device is configured to cause the actuation mechanism to move the battery element in response to detecting the touch input along the outer surface of the transparent cover. In a number of examples, the electronic device further includes a circuit assembly positioned along a side of the battery element and the flexure includes a flexible metal substrate and a flexible circuit laminate disposed on the flexible metal substrate, the flexible circuit laminate including a set of conductive traces that electrically couples the battery element to the circuit assembly. In some implementations of such examples, the flexible circuit laminate includes multiple conductive traces.

In various examples, the flexure includes two straight segments that are connected by a joint and the joint is configured to bend in response to the movement of the battery element. In some examples, the electronic device further includes a tray that is configured to receive the battery element, the tray at least partially surrounds the battery element, and the tray moves with the battery element when the battery element is moved by the actuation mechanism.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
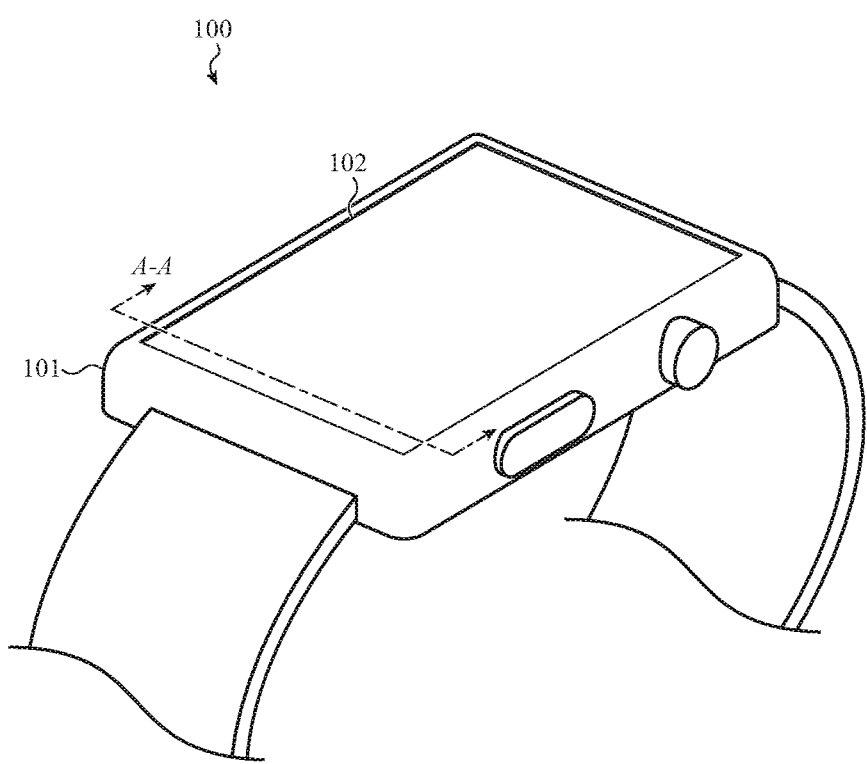
FIG. 1A depicts an example electronic device that includes a haptic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

Increasingly, electronic devices are becoming smaller while including more and/or more powerful components. This may create the need for solutions to enable all of the components for an electronic device to be included inside. Internal space may be at a premium and compromises may be made between component size, component performance, and component features.

This may particularly be the case for portable devices, such as smart phones, tablet computing devices, electronic watches and/or other wearable devices, and so on. Portable devices may be even smaller than other electronic devices, putting internal space further at a premium, and may additionally include one or more battery elements that may be used to power one or more other components (though some non-portable devices, such as vehicles, may also include one or more battery elements). Battery life may at least partially be a function of battery element size, and tradeoffs may be made between battery life and available space for battery elements versus other components, such as one or more haptic devices that are operable to provide haptic output.

As used herein, the term "haptic output" may be used to refer to a vibration or inertial pulse that is tactilely perceptible along an exterior surface of the device. A haptic output may be produced alone or in coordination with other device outputs including an audible output produced by a device speaker or a visual output produced by a graphical user interface, display, or light-emitting element. A haptic output may be used to simulate mechanical feedback in response to a touch or other user input. The haptic output may also be used to signal an alert or other event, such as a received message, completion of a timer, incoming phone call, and so on.

For example, tradeoffs may be made between battery life and available space for battery elements versus other components discussed above. A portable electronic device may include both a battery element for power and a haptic device that moves a mass (such as a tungsten weight) to produce haptic output. The battery element may be smaller than would be possible if the haptic device was not included, decreasing possible battery life (and thus usable portable electronic device life). Similarly, the haptic device may be smaller than would otherwise be possible if the battery element was not included. The less space available for the haptic device, the less space available for the mass included in the haptic device. The smaller the mass of the haptic device, the further that the haptic device may need to move the mass in order to produce the same haptic output. For example, a first mass half as large as a second mass may move twice as far in order to generate the same magnitude of haptic output. For example, a two gram weight may move 0.8 millimeters to produce the same haptic output as a four gram weight that moves 0.4 millimeters. Thus, even when the mass is made smaller to accommodate a larger battery element, the additional space needed for the haptic device to move the mass may still limit available space for battery element size. A larger battery element may require a smaller haptic device, which may not have a large enough mass and/or move the mass far enough to generate haptic output with a desired magnitude.

This tradeoff may be overcome by integrating a battery element (used to power the electronic device) into an oscillating mass used to produce a haptic output for the electronic device. By not including separate battery elements and haptic device masses, the battery elements can be larger, increasing battery life. Further, the larger size may decrease the amount of space that the haptic device moves the battery in order to generate the haptic output, freeing up space for other components. Using a battery element as a mass for a haptic device may involve actuation mechanisms operable to move the battery element, flexible connectors that allow the battery element to remain electrically connected during the movement, support mechanisms that allow the battery element to move, battery element configurations that are not damaged by the movement, and so on.

The following disclosure relates to a haptic device that includes a moving battery element. The haptic device may be included in an electronic device, such as an electronic watch. The haptic device may include the battery element, an actuation mechanism that is operable to move the battery element, a support mechanism that is operable to allow the battery element to move, and a flexible connector that electrically connects the battery element to another component during the movement.

For example, an electronic watch may include an enclosure having a transparent cover defining a touch-sensitive surface, a display positioned within the enclosure and below the transparent cover, and a haptic device configured to produce a haptic output along the touch-sensitive surface. The haptic device may include a battery element electrically coupled to the display, a magnetic element, and a coil assembly fixed with respect to the enclosure and configured to induce an oscillatory movement of the battery element parallel to the display to produce the haptic output.

By way of another example, an electronic watch may include an enclosure having a transparent cover defining a touch-sensitive surface, a display positioned within the enclosure and below the transparent cover, and a haptic device configured to produce a haptic output along the touch-sensitive surface. The haptic device may include a battery element electrically coupled to the display, a first magnetic element fixed with respect to the enclosure, a second magnetic element fixed with respect to the enclosure, and a coil assembly coupled to the battery element and configured to induce an oscillatory movement of the battery element parallel to the display to produce the haptic output.

In yet another example, an electronic watch may include an enclosure having a transparent cover defining a touch-sensitive surface, a display positioned within the enclosure and below the transparent cover, a battery element disposed within the electronic watch, an actuation mechanism that is operable to move the battery element from an initial position in a direction parallel to the display to provide a haptic output, and a flexure. The flexure may deform to allow movement of the battery element, return the battery element to the initial position after the movement, and electrically connect the battery element to the display during the movement.

These and other embodiments are discussed below with reference to FIGS. 1A-16. However, those skilled in the art will readily appreciate that the detailed description given herein with respect to these Figures is for explanatory purposes only and should not be construed as limiting.

FIG. 1A depicts an example electronic device 100 that includes a haptic device. The electronic device 100 may be an electronic watch having an enclosure 101 and a display assembly 102 (which may include a transparent cover defining a touch-sensitive surface and a display positioned below the transparent cover) and/or other components.

Although the electronic device 100 is illustrated and described as an electronic watch, it is understood that this is an example. In various implementations, the electronic device 100 may be any kind of electronic device without departing from the scope of the present disclosure, including, without limitation, a mobile phone, a tablet computing device, a laptop computing device, a media player device, or a health monitoring device. Other example devices include a portable electronic device, a smart phone, a mobile computing device, an input device, a computer mouse, a tablet computing device, a kitchen appliance, a display, a keyboard, and so on.

Figure 1B:
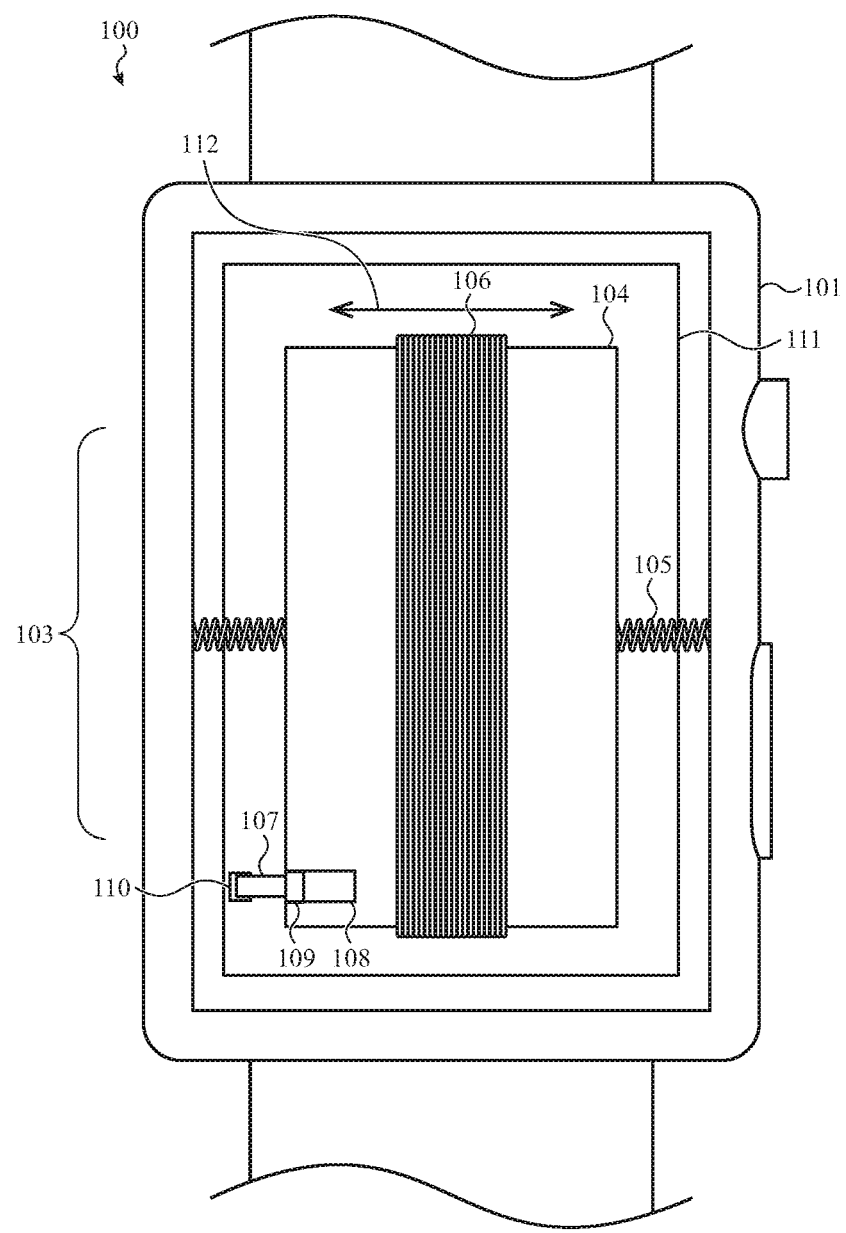
FIG. 1B depicts the electronic device of FIG. 1A with the display removed so that a first example haptic device is visible.

FIG. 1B depicts the electronic device 100 of FIG. 1A with the display assembly 102 removed so that a first example haptic device 103 is visible. The haptic device 103 may include an actuation mechanism 106 that is operable to move a battery element 104, a support mechanism 105 that allows the battery element 104 to move, and a flexible connector 107 that electrically connects the battery element 104 to one or more electronic components (such as a circuit assembly 111, the display assembly 102 of FIG. 1A via the circuit assembly 111, and so on) during the movement.

The actuation mechanism 106 may be configured to induce an oscillatory movement of the battery element 104 parallel to the display assembly 102 of FIG. 1A to produce haptic output along the display assembly 102 of FIG. 1A. As used herein, the term "oscillatory movement" may be used to refer to a repeating movement that passes through a central or resting position. It is not necessary that the movement be periodic or have regularly repeating intervals. As used herein, the term "oscillatory movement" may be used to cover repetitive motion that causes a vibration as well as a motion that causes an inertial impulse.

By way of illustration, the actuation mechanism 106 may be configured to move the battery element 104 from an initial position shown in one or more directions (or linear paths) 112. In this example, the actuation mechanism 106 may be a coil assembly that interacts with one or more magnetic elements to induce the oscillatory movement of the battery element 104. One of the coil assembly or the one or more magnetic elements may be coupled to the battery element 104 while the other is fixed with respect to the enclosure, such as coupled to the enclosure 101 and/or an intermediate element. For example, the coil assembly may be an electromagnetic coil formed in a loop through which alternating current may pass. The alternating current may generate magnetic flux, which may interact with one or more magnetic elements to move the battery element 104 in the one or more directions 112. In some implementations, the current may be provided from the battery element 104. However, it is understood that this is an example and that other implementations are possible and contemplated without departing from the scope of the present disclosure.

The support mechanism 105 may allow the battery element 104 to move. The support mechanism 105 may allow the battery element 104 to move from an initial position shown in one or more directions 112 and may be operable to subsequently return the battery element 104 to the initial position. For example, the support mechanism 105 may be one or more spring elements (such as a first spring element positioned at a first end of the battery element 104 and configured to produce a first restoring force and a second spring element positioned at a second end of the battery element 104 opposite to the first end and configured to produce a second restoring force opposite to the first restoring force), flexures, gels, deformable materials, and/or similar mechanisms that allow the battery element 104 to move from the initial position and/or subsequently return to the initial position. However, it is understood that this is an example and that other implementations are possible and contemplated without departing from the scope of the present disclosure.

The flexible connector 107 may be any kind of electrical and/or communication connector that allows the battery element 104 to remain electrically connected during movement of the battery element 104, such as to the circuit assembly 111, to the display assembly 102 of FIG. 1A via the circuit assembly 111, and so on. For example, the flexible connector 107 may be a flex cable or other flexible electrical circuit formed of a flexible substrate (such as polyimide or similar material, metal, and so on) with flexible conductive traces (such as copper or similar material) formed thereon (and/or onto a passivation layer formed thereon) that is operable to stretch, bend, and/or otherwise deform during the movement (such as to provide a restoring force after movement of the battery element 104). However, it is understood that this is an example and that other implementations are possible and contemplated without departing from the scope of the present disclosure.

Although the above illustrates and describes use of the actuation mechanism 106 to induce an oscillatory movement of the battery element 104 parallel to the display assembly 102 of FIG. 1A to produce haptic output along the display assembly 102 of FIG. 1A, it is understood that this is an example. In various implementations, the actuation mechanism 106 may be used to produce haptic output via the display assembly 102 of FIG. 1A, one or more input devices such as the crown and/or button illustrated along the side of the enclosure 101, one or more surfaces of the enclosure 101, the band shown connected to the enclosure 101, any combination of these components, and so on. Various configurations are possible and contemplated without departing from the scope of the present disclosure.

Although the above illustrates and describes the actuation mechanism 106, the support mechanism 105, and the flexible connector 107 as separate components, it is understood that this is an example. In various implementations, one or more of these components may be combined. For example, in various implementations, the support mechanism 105 may both allow motion of the battery element 104 and electrically connect the battery element 104 to one or more other components during the movement. Various configurations are possible and contemplated without departing from the scope of the present disclosure.

The battery element 104 may include one or more terminals 109 (such as one or more positive terminals, negative terminals, communication connection terminals, and so on) that connect to the flexible connector 107 and/or a battery protection circuit 108. Similarly, the circuit assembly 111 may include one or more board connectors 110 (such as one or more power board connectors, communication connection board connectors, and so on). The battery element 104 may connect to the circuit assembly 111 and/or the battery protection circuit 108 via the terminal 109, the flexible connector 107, and the board connector 110.

The circuit assembly 111 may include one or more circuit boards, such as a stack formed of multiple circuit boards, an encapsulated chip and substrate combination (such as a System in Package or "SIP"), and so on. The circuit assembly 111 may include one or more processing units and/or other processors or controllers, one or more interfaces to the display assembly 102 of FIG. 2 and/or various input/output mechanisms (such as one or more connectors that provide power from the battery element 104 to the display assembly 102), one or more non-transitory storage media (which may take the form of, but is not limited to, a magnetic storage medium; optical storage medium; magneto-optical storage medium; read only memory; random access memory; erasable programmable memory; flash memory; and so on) and/or one or more connections thereto, and so on. The processing unit and/or other components of the circuit assembly 111 may be operable to control operation of the actuation mechanism 106, direct movement of the battery element 104, electrically connect the battery element 104 to other components (such as the display assembly 102 of FIG. 1A), control charging and/or discharging of the battery element 104, monitor a position of the battery element 104 (such as using one or more Hall effect sensors, positivity sensors, and so on) and/or alter control movement of the battery element 104 based thereon (such as to precisely control the oscillatory movement and/or cessation of such movement for generation of precisely controlled haptic output), and so on. In some examples, the circuit assembly 111 may include a drive circuit that is configured to apply an oscillating current to a coil assembly (such as that of the actuation mechanism 106). The battery element 104 may provide power to the drive circuit to produce the oscillating current.

The battery protection circuit 108 may control charging and/or discharging of the battery element 104. This may control battery management functions such as monitoring a state of the battery element 104 (such as a charge amount of the battery element 104, a temperature of the battery element 104, an amount of power being provided to and/or from the battery element 104, and so on), altering power being provided to and/or from the battery element 104, monitoring a position of the battery element 104 (such as using one or more Hall effect sensors, positivity sensors, and so on), and so on.

In various implementations, the haptic output may be provided in coordination with one or more graphical elements or items of a graphical user interface presented on a display of the display assembly 102. By way of example, in some implementations, the haptic output may be provided when a touch is detected to the graphical user interface. In other examples, the haptic output may be provided when a touch is detected that corresponds to the location of a graphical item presented by the graphical user interface. In still other examples, a first haptic output may be provided when a touch is detected and interpreted as a touch input that corresponds to the location of a graphical item presented by the graphical user interface and a second haptic output may be provided when a selection of the graphical item relating to a detected touch duration is detected (which may initiate a change to the presentation of the graphical user interface that corresponds to the selection). Various configurations are possible and contemplated without departing from the scope of the present disclosure.

Further, although the above describes haptic output being provided in response to touch detected corresponding to of a graphical user interface presented on a display of the display assembly 102, it is understood that this is an example. In other implementations, the haptic output may be provided in response to any number of different actions. For example, the haptic output may be provided in response to receipt of an incoming notification, movement of a crown, presses of a solid state and/or other button, application events, alarms, and so on. Various configurations are possible and contemplated without departing from the scope of the present disclosure.

Figure 1C:
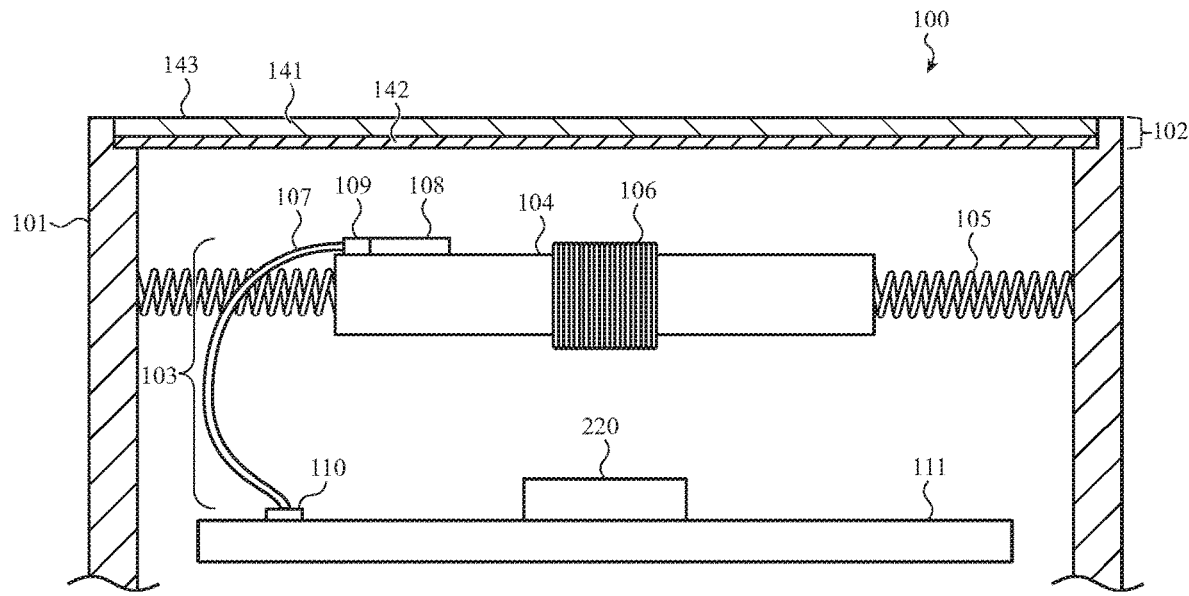
FIG. 1C depicts a cross section of the electronic device of FIG. 1A, taken along line A-A.

FIG. 1C depicts a cross section of the electronic device 100 of FIG. 1A, taken along line A-A. In this example, the battery protection circuit 108 may be disposed on the battery element 104 and connected to the battery element 104 via the terminal 109. Similarly, the battery element 104 may be connected to the circuit assembly 111 via the terminal 109, the flexible connector 107, and the board connector 110. The battery element 104 may also be connected to the enclosure 101 via the support mechanism 105.

As also illustrated, the actuation mechanism 106 may be a coil assembly looped around and coupled to the battery element 104. The coil assembly may be operative to induce movement of the battery element 104 by generating magnetic flux that interacts with one or more magnetic elements 220 when current is provided to the current assembly. In this example, the magnetic element 220 may be fixed with respect to the enclosure by being coupled to the circuit assembly 111. As such, the coil assembly may move with the battery element 104 while the magnetic element 220 does not.

As further illustrated, the display assembly 102 may include a transparent cover 141 that defines a touch-sensitive surface 143. A display 142 may be positioned within the enclosure 101 and below the transparent cover 141. In some implementations, the display 142 may be a touch display. In other implementations, one or more touch sensors may be also be included, and may be positioned above and/or below the display 142.

Figure 1D:
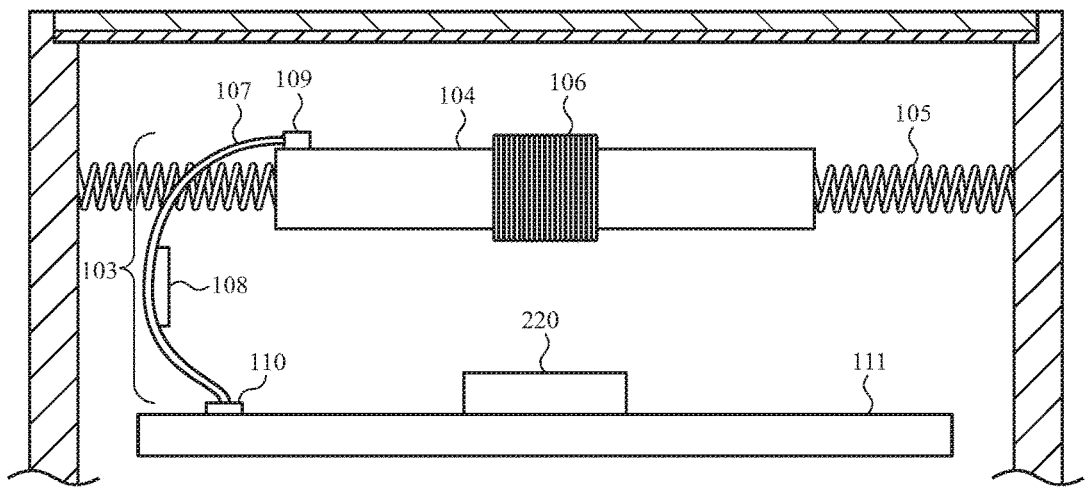
FIG. 1D depicts a first alternative example of the haptic cell of FIG. 1C.

FIG. 1D depicts a first alternative example of the haptic device 103 of FIG. 1C. Similar to FIG. 1C, the actuation mechanism 106 is operable to move a battery element 104 connected to a circuit assembly 111 via the terminal 109, the flexible connector 107, and the board connector 110 by generating magnetic flux that interacts with one or more magnetic elements 220. By way of contrast with FIG. 1C, the battery protection circuit 108 of FIG. 1D is disposed on the flexible connector 107 instead of the battery element 104 and is connected to the battery element 104 via the flexible connector 107 rather than directly through the terminal 109.

Figure 1E:
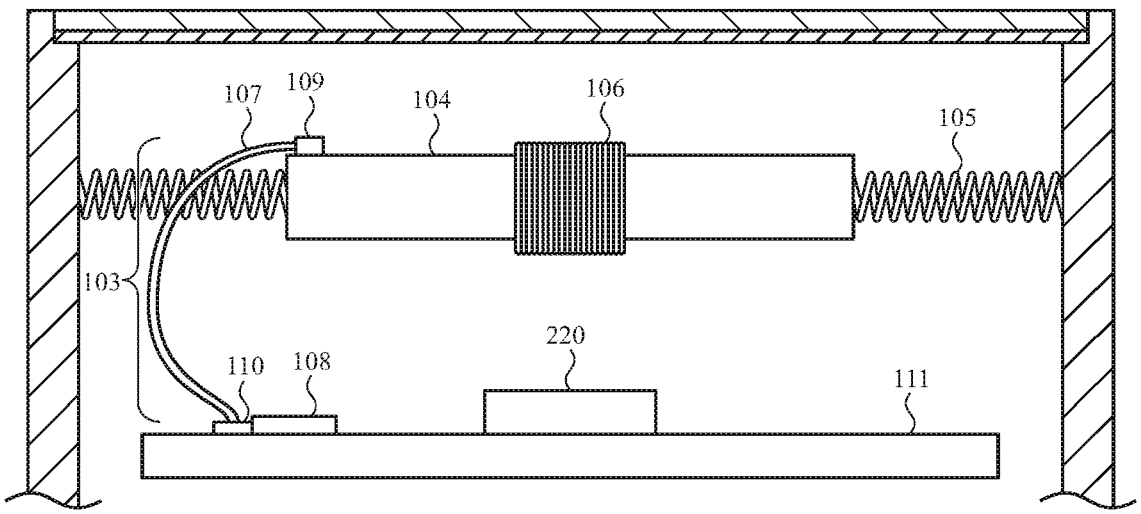
FIG. 1E depicts a second alternative example of the haptic cell of FIG. 1C.

FIG. 1E depicts a second alternative example of the haptic device 103 of FIG. 1C. Similar to FIG. 1C, the actuation mechanism 106 is operable to move a battery element 104 connected to a circuit assembly 111 via the terminal 109, the flexible connector 107, and the board connector 110 by generating magnetic flux that interacts with one or more magnetic elements 220. By way of contrast with FIG. 1C, the battery protection circuit 108 of FIG. 1E is disposed on the circuit assembly 111 instead of the battery element 104 and is connected to the battery element 104 via the board connector 110 and the flexible connector 107 rather than directly through the terminal 109.

Figure 1F:
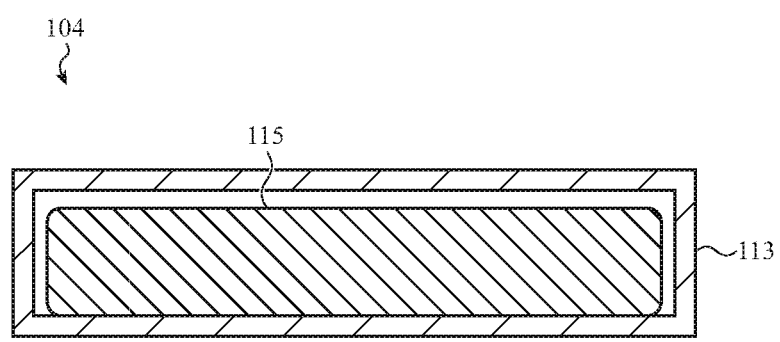
FIG. 1F depicts the battery element of FIG. 1C with a portion cut away to show internal components.

FIG. 1F depicts the battery element 104 of FIG. 1C with a portion cut away to show internal components. The battery element 104 may include a case 113 with one or more battery cells 115 (such as one or more jelly roll pouches and/or other battery cells) inside. In some examples, the case 113 may be formed of a protective material, such as steel or other metal or other hard substance. Enclosing the battery cell 115 in the case 113 may function to protect the battery cell 115 from damage that may occur during movement.

Figure 1G:
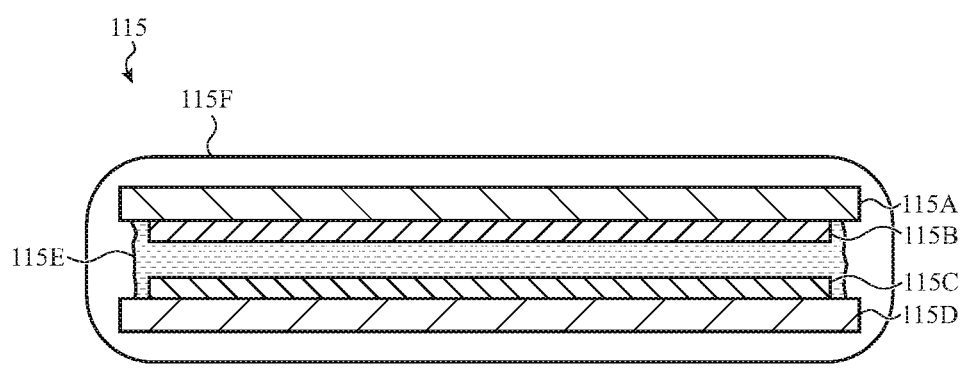
FIG. 1G depicts an example implementation of the battery cell.

For example, FIG. 1G depicts an example implementation of the battery cell 115. As shown, the battery cell 115 may include a pouch 115F enclosing an anode current collector 115A, anode active material 115B disposed on the anode current collector 115A, a cathode current collector 115D, cathode active material 115C disposed on the cathode current collector 115D, and electrolyte 115E positioned between the anode current collector 115A and the cathode current collector 115D around the anode active material 115B and the cathode active material 115C. However, it is understood that this is an example and that in other implementations other battery cell 115 configurations are possible without departing from the scope of the present disclosure.

The composition of the battery cells 115 may also be configured to protect the battery cell 115 from damage that may occur during movement. One challenge to vibrating batteries may be faster battery capacity degradation over time. Many battery cells 115 may include electrode particles (such as in the anode active material 115B and/or the cathode active material 115C) mixed with a binder, such as an adhesive. Once cured, the material may be brittle and vibration may induce cracking and flaking in the battery cell 115. One solution may involve increasing binder ratio of electrode coatings over typical battery cell 115 composition. This may increase adhesion to electrode foils and make the battery cells 115 less vulnerable to damage from the movement. This ratio may typically be minimized to maximize battery capacity as it swaps inactive material for active, but the damage prevention may make the tradeoff worthwhile, particularly as combining batteries and haptic weights may allow for increased battery sizes, making up for any potential lost battery capacity due to the increased binder ratio.

Additionally, this may result in a reduced battery capacity initially, but may make up the reduction in rate of capacity degradation over time due to being less vulnerable to damage. By way of other examples, inner metal foil thicknesses may be increased. This may make battery cells 115 more robust to dynamic stress and tearing. In yet another example, increased separator overhangs in battery cells 115 (such as in jelly roll battery cells) may cushion impact that can occur during dynamic stress. By way of illustration, the anode current collector 115A and the cathode current collector 115D extend further than the anode active material 115B and the cathode active material 115C such that the overhang defined by the anode current collector 115A and the cathode current collector 115D prevent impact of the anode active material 115B and/or the cathode active material 115C.

Other components may be used beyond battery cell 115 configurations to prevent damage. For example, wave forms may be used to drive actuation mechanisms that move the battery element 104 to maximize voltage potential with the presence of vibrations. By way of another example, battery cells may be oriented to maximize voltage potential with vibrations. In still other examples, foam or other cushioning material may be added to the case 113 to cushion impact of the battery cell 115.

Figure 1H:
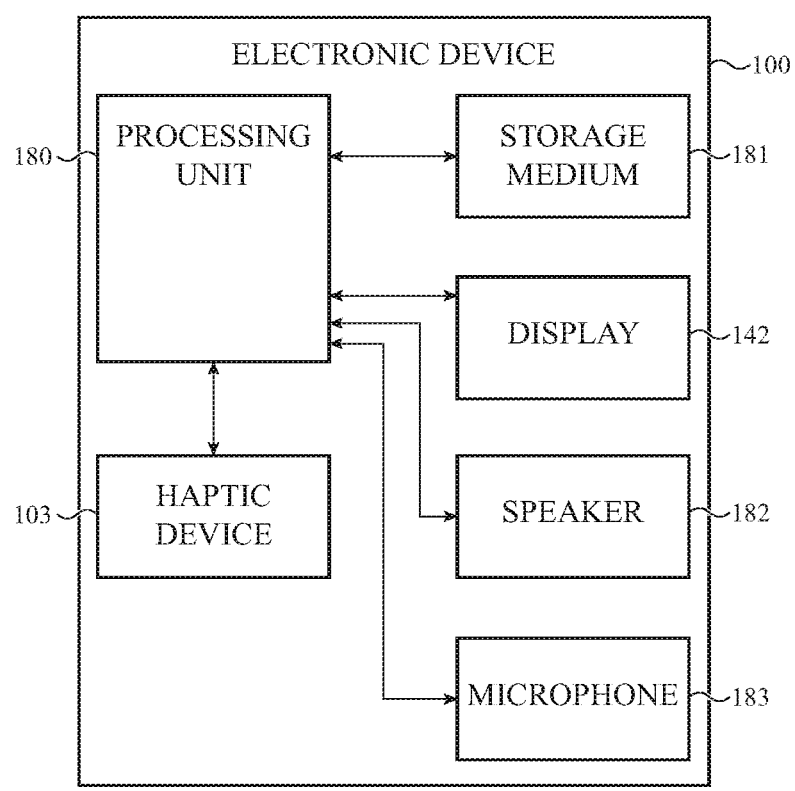
FIG. 1H depicts example functional relationships among example components that may be used to implement the example electronic device of FIG. 1A.

FIG. 1H depicts example functional relationships among example components that may be used to implement the example electronic device 100 of FIG. 1A. For example, a processing unit 180 may be operative to execute instructions stored in a non-transitory storage medium 181 to perform various functions. Such functions may include providing output via a display 142, a speaker 182, a haptic device 103, and/or other output components. Such functions may also include obtaining input, such as via a microphone 183, a touch sensor included in and/or associated with the display 142, and so on.

Figure 2A:
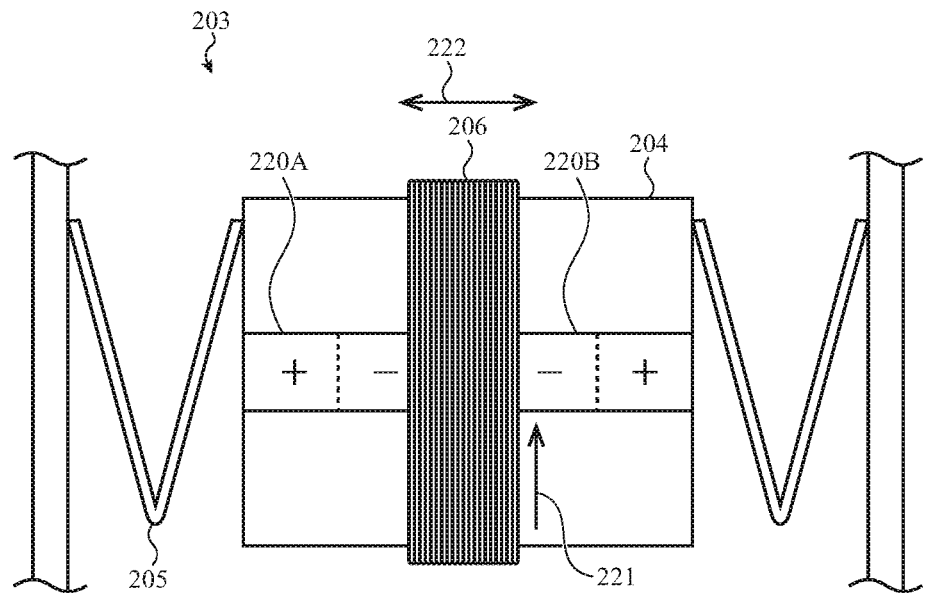
FIG. 2A depicts a second example haptic device.

FIG. 2A depicts a second example haptic device 203. The haptic device 203 may include a battery element 204, support mechanisms 205, and an actuation mechanism 206. By way of contrast with the haptic device 103, the support mechanism 205 may be a flexure formed of a piece of a rigid material that is bent into a "V" shape to define two arms connected by a joint. The support mechanisms 205 may allow the battery element 204 to move by bending and allowing the ends of the two arms of the "V" to approach each other. Due to the rigidity of the material, the support mechanisms 205 may then unbend (which may exert a restoring force), allowing the ends of the two arms of the "V" to move away from each other again.

In some examples, the support mechanisms 205 may be formed of one or more conductive materials. In such an example, the support mechanisms 205 may also operate as a flexible connector that electrically connects the battery to one or more other components.

Similar to the haptic device 103, the actuation mechanism 206 may be a coil assembly including an electromagnetic coil wrapped in a loop around the battery element 204 through which current may be run in a direction 221 to generate magnetic flux that interacts with first and second magnetic elements 220A, 220B to produce the movement in a direction 222. By way of contrast with the haptic device 103, the first and second magnetic elements 220A, 220B may be coupled to the battery element 204 whereas the coil assembly is fixed. As such, the first and second magnetic elements 220A, 220B may move with the battery element 204 while the coil assembly does not.

Figure 2B:
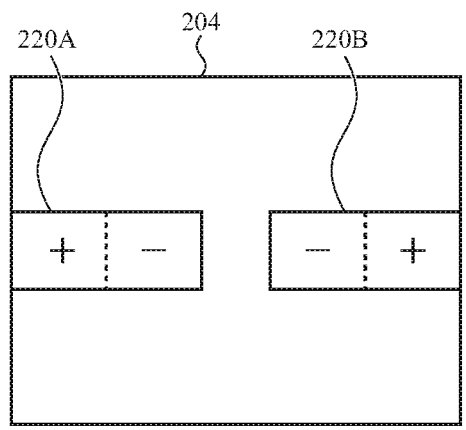
FIG. 2B depicts the haptic device of FIG. 2A with the support mechanisms and the actuation mechanism removed.

FIG. 2B depicts the haptic device 203 of FIG. 2A with the support mechanisms 205 and the actuation mechanism 206 removed. The battery element 204 may extend around the first and second magnetic elements 220A, 220B. As such, the battery element 204 may define internal first and second opposing sides to which the first and second magnetic elements 220A, 220B are respectively coupled. Various configurations are possible and contemplated without departing from the scope of the present disclosure.

Figure 3A:
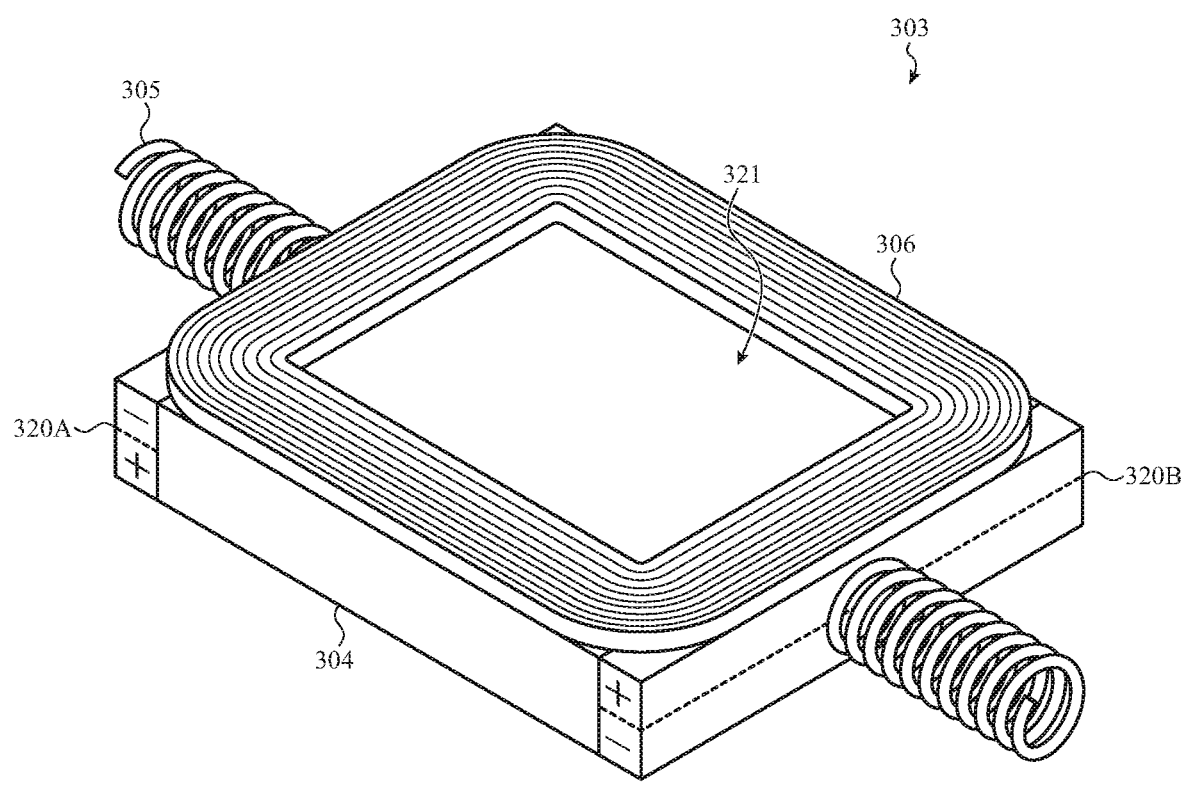
FIG. 3A depicts a third example haptic device.

FIG. 3A depicts a third example haptic device 303. The haptic device 303 may include a battery element 304, support mechanisms 305, and an actuation mechanism 306. By way of contrast with the haptic device 103, the battery element 304 may define first and second opposing sides to which the first and second magnetic elements 320A, 320B are respectively coupled. The support mechanism 305 may also be coupled to the first and second magnetic elements 320A, 320B.

Similar to the haptic device 103, the actuation mechanism 306 may be a coil assembly including an electromagnetic coil wrapped in a loop to generate magnetic flux that interacts with first and second magnetic elements 320A, 320B to produce the movement. By way of contrast with the haptic device 103, the loop may be wrapped in a plane parallel to the battery element 304 such that the battery element 304 is positioned outside of the loop. As such, the first and second magnetic elements 320A, 320B may move with the battery element 304 while the coil assembly does not. Further, the loop may define a cavity 321 in which other components may be disposed. Various configurations are possible and contemplated without departing from the scope of the present disclosure.

Although FIG. 3A is illustrated and described as including the first and second magnetic elements 320A, 320B that interact with the magnetic flux produced by the electromagnetic coil of the actuation mechanism 306 to produce the movement, it is understood that this is an example. In other implementations, the first and second magnetic elements 320A, 320B may be omitted.

Figure 3B:
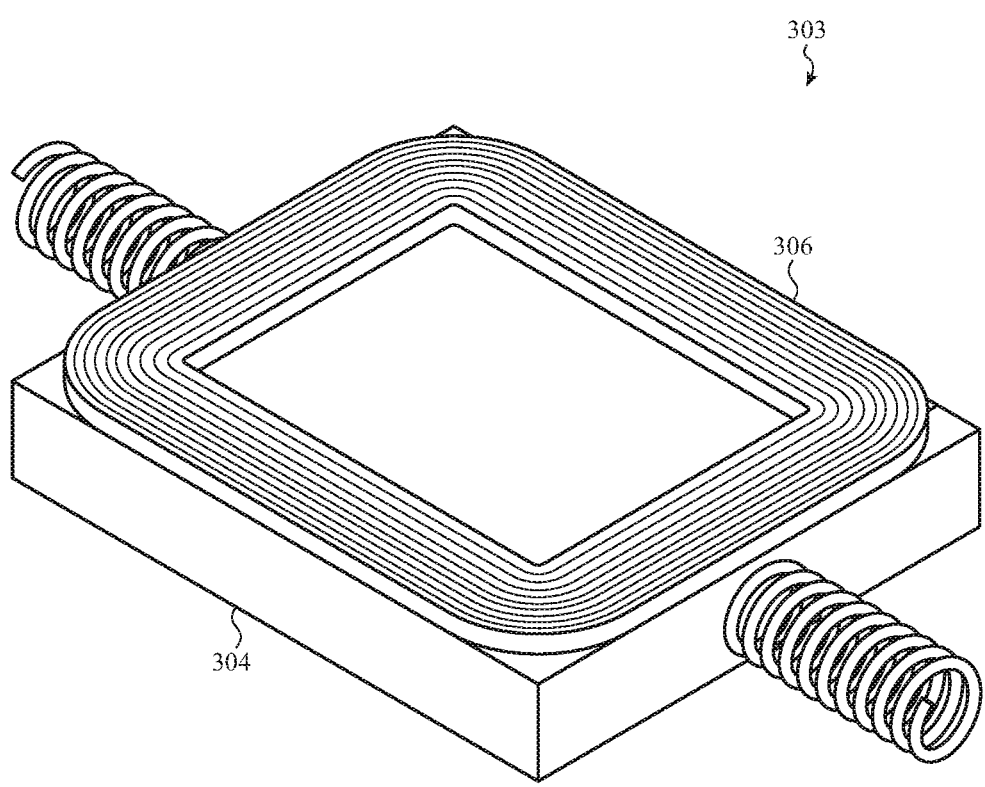
FIG. 3B depicts an alternative example of the third example haptic device that omits the first and second magnetic elements.

For example, FIG. 3B depicts an alternative example of the third example haptic device 303. In this example, a case or similar structure of the battery element 304 may be formed from a welded ferrous material or other material that interacts with the magnetic flux produced by the electromagnetic coil of the actuation mechanism 306 to produce the movement. As such, the case of the battery element 304 may itself be a magnetic element and a separate magnetic element may be omitted.

Figure 4:
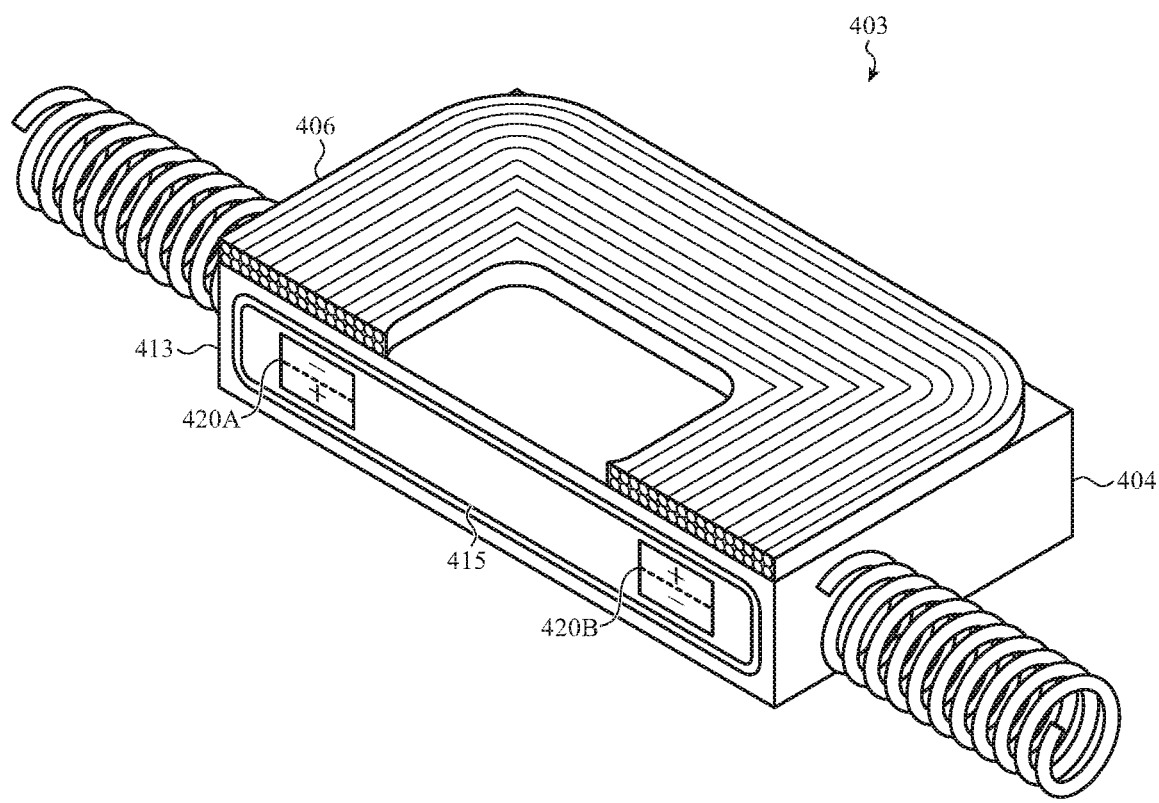
FIG. 4 depicts a fourth example haptic device that includes a battery element with a portion cut away to show internal components.

FIG. 4 depicts a fourth example haptic device 403 that includes a battery element 404 with a portion cut away to show internal components. Similar to the haptic device 103, the actuation mechanism 406 may be a coil assembly including an electromagnetic coil wrapped in a loop to generate magnetic flux that interacts with first and second magnetic elements 420A, 420B to produce the movement. By way of contrast with the haptic device 103, the battery element 404 may include one or more battery cells 415 inside a case 413 where the first and second magnetic elements 420A, 420B are embedded within the battery cells 415 and/or the case 413. In other words, the battery element 404 may define a cavity within which the second magnetic elements 420A, 420B may be disposed. Various configurations are possible and contemplated without departing from the scope of the present disclosure.

Figure 5A:
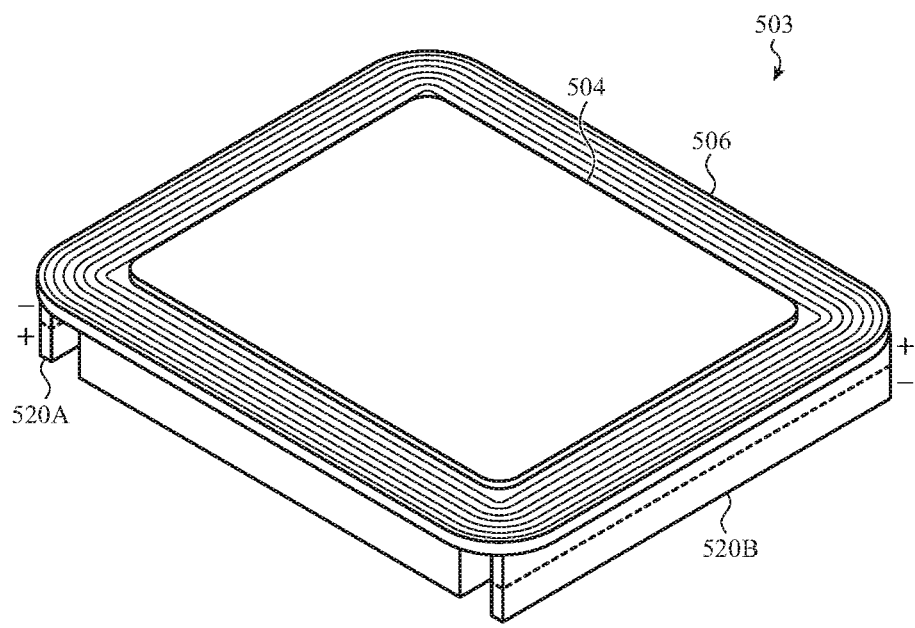
FIG. 5A depicts a fifth example haptic device.
Figure 5B:
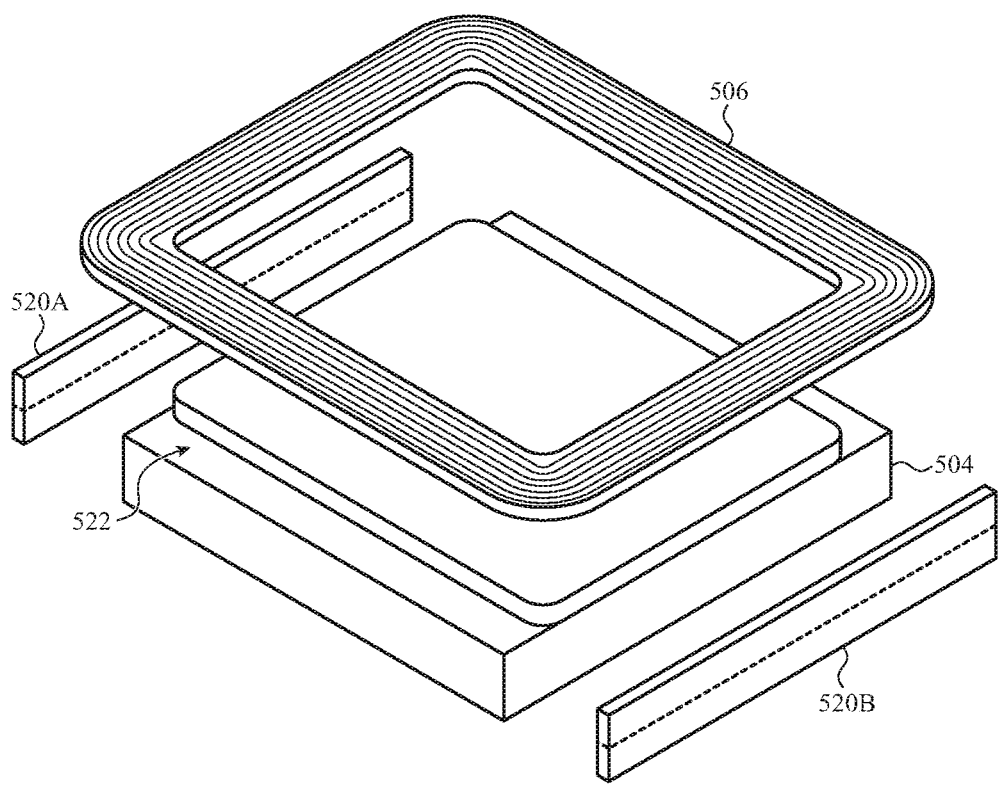
FIG. 5B depicts an exploded view of the battery element of FIG. 5A.

FIG. 5A depicts a fifth example haptic device 503. FIG. 5B depicts an exploded view of the battery element 504 of FIG. 5A. With respect to FIGS. 5A and 5B, similar to the haptic device 303 of FIG. 3A, the actuation mechanism 506 may be a coil assembly that interacts with first and second magnetic elements 520A, 520B coupled to first and second opposing sides defined by a battery element 504. However, unlike the haptic device 403, the battery element 504 may define a shelf 522 (FIG. 5B) around which the coil assembly may be looped such that there is no cavity 321. Various configurations are possible and contemplated without departing from the scope of the present disclosure.

Figure 6A:
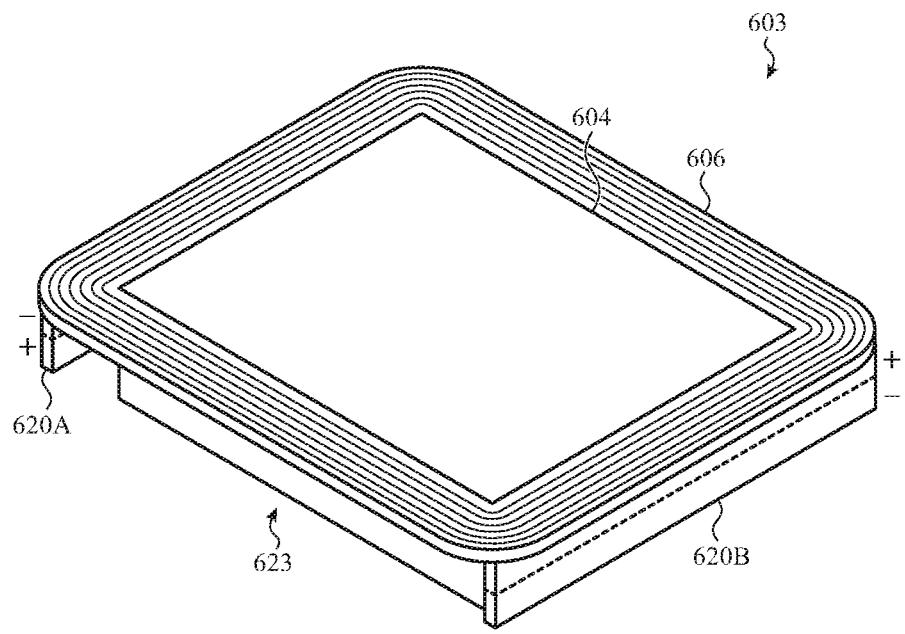
FIG. 6A depicts a sixth example haptic device.
Figure 6B:
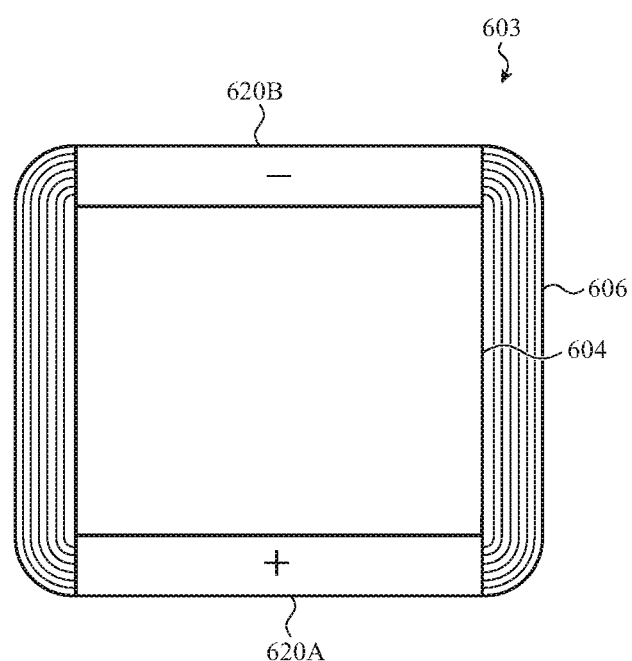
FIG. 6B depicts a bottom view of the haptic device of FIG. 6A.

The coil assembly in FIG. 5A is shown as flush with the combined assembly of the battery element 504 and the first and second magnetic elements 520A, 520B. However, it is understood that this is an example. For example, FIG. 6A depicts a sixth example haptic device 603 where a coil assembly of an actuation mechanism 606 extends flush with first and second magnetic elements 620A, 620B but extends over a battery element 604. This may define a cavity 623 where other components may be located. FIG. 6B depicts a bottom view of the haptic device 603 of FIG. 6A. This illustrates how the actuation mechanism 606 hangs over the battery element 604 but not the first and second magnetic elements 620A, 620B. Various configurations are possible and contemplated without departing from the scope of the present disclosure.

Although the magnetic elements 220A, 220B, 320A, 320B, 420A, 420B, 520A, 520B, and 620A, 620B are illustrated in FIGS. 2A-6 as having a particular polarity configuration, it is understood that these are examples. In various examples, magnetic elements with a variety of different polarity configurations may be used without departing from the scope of the present disclosure.

Figure 7:
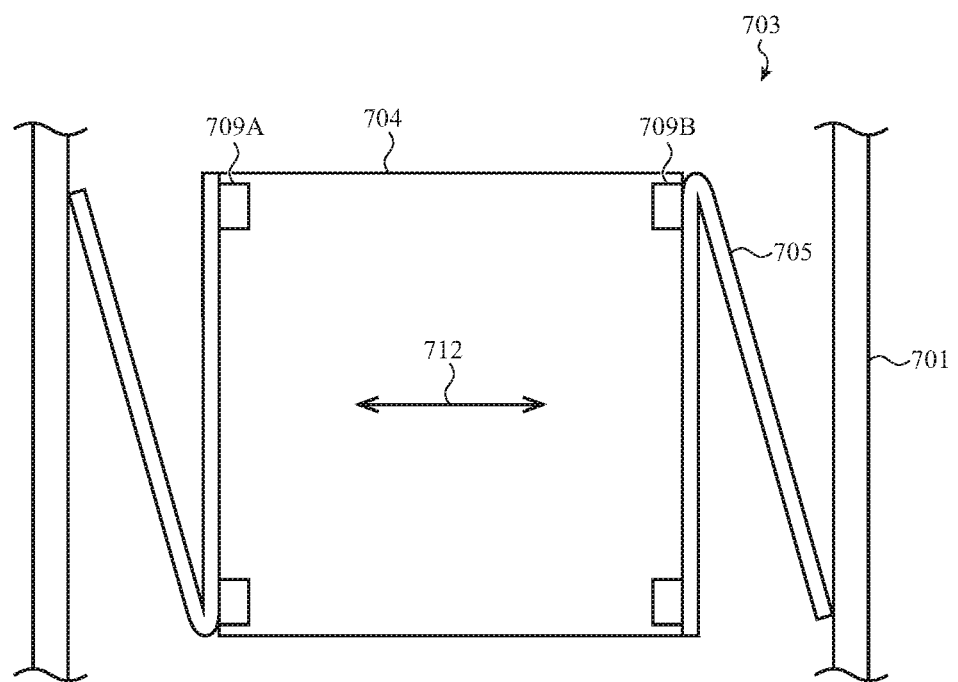
FIG. 7 depicts a seventh example haptic device.

FIG. 7 depicts a seventh example haptic device 703. In this example, flexures 705 contact a positive terminal 709A, a negative terminal 709B of a battery element 704, and an enclosure 701. The flexures 705 may be configured to bend to allow motion of the battery element 704 from an initial position in one or more directions 712 and then unbend to return the battery element 704 to the initial position. The flexures 705 may also be formed of a conductive material to electrically connect the positive terminal 709A and the negative terminal 709B to one or more other components.

In some implementations, the flexures 705 may be formed of a single piece of conductive material. This may enable a single conductive pathway to and/or from the positive terminal 709A and/or the negative terminal 709B. However, it is understood that this is an example. Various configurations are possible and contemplated without departing from the scope of the present disclosure.

Figure 8:
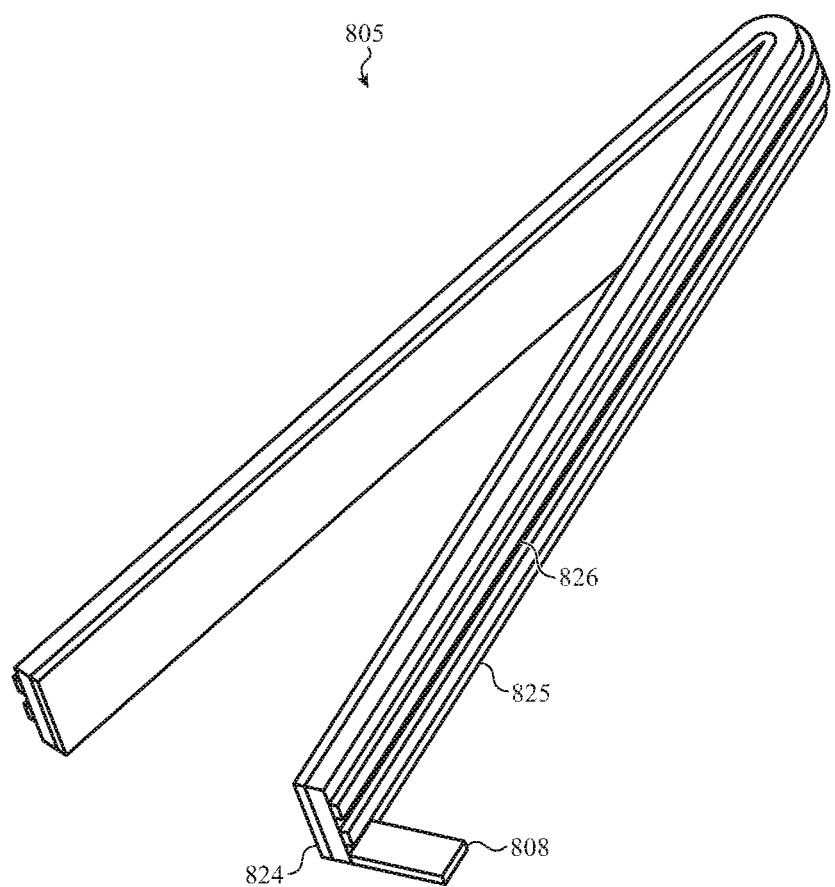
FIG. 8 depicts an alternative example of a flexure that may be used as one of the flexures in the haptic device of FIG. 7.

By way of example, FIG. 8 depicts an alternative example of a flexure 805 that may be used as one of the flexures in the haptic device of FIG. 7. The flexure 805 may be formed of a substrate 824 and a flexible circuit laminate formed on the substrate 824 made up of a nonconductive base 825 and one or more traces 826 formed on the nonconductive base 825. The flexure 805 may include two straight segments that are connected by a joint. The joint may be configured to bend in response to the movement of the battery element.

The traces 826 may enable one or more different electrical and/or communication pathways in and/or out of a battery element, such as the battery element 704 of FIG. 7. For example, the traces 826 may electrically and/or communicably connect a battery protection circuit 808 included on the flexure 805 to such a battery element.

For example, the substrate 824 may be formed of a rigid material that enables the flexure 805 to bend under the application of force and unbend when the force is no longer exerted, such as metal, and the nonconductive base 825 may be formed of a material that electrically isolates the traces 826 from the substrate 824, such as polyimide. In other examples, the substrate 824 may be formed of a nonconductive material and the nonconductive base 825 may be omitted.

In various implementations, one or more conductive materials may be disposed over one or more portions of the traces 826. This may prevent unintended electrical contact with the covered portions of the traces 826 while allowing electrical contact with the uncovered portions of the traces 826. Various configurations are possible and contemplated without departing from the scope of the present disclosure.

Figure 9:
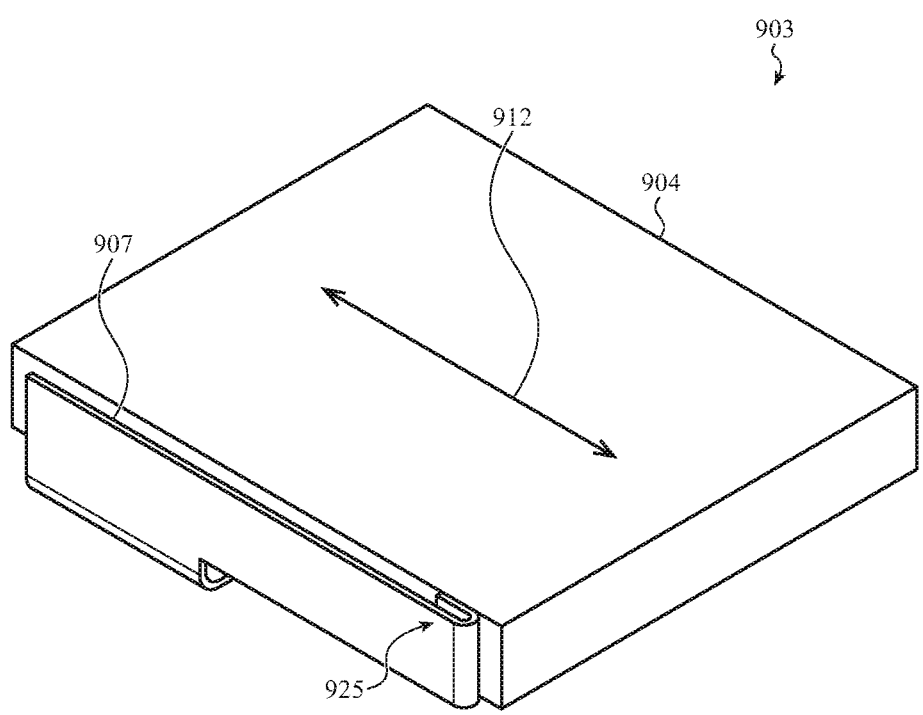
FIG. 9 depicts an eighth example haptic device.

FIG. 9 depicts an eighth example haptic device 903. In this example, a flexible connector 907 formed of a flexible circuit cable is coupled to a battery element 904 moveable in one or more directions 912. The flexible circuit cable is configured with a bend 925 positioned approximately perpendicular to the directions 912 that may function as a pulley to allow the battery element 904 to remain electrically connected during movement. Various configurations are possible and contemplated without departing from the scope of the present disclosure.

Figure 10:
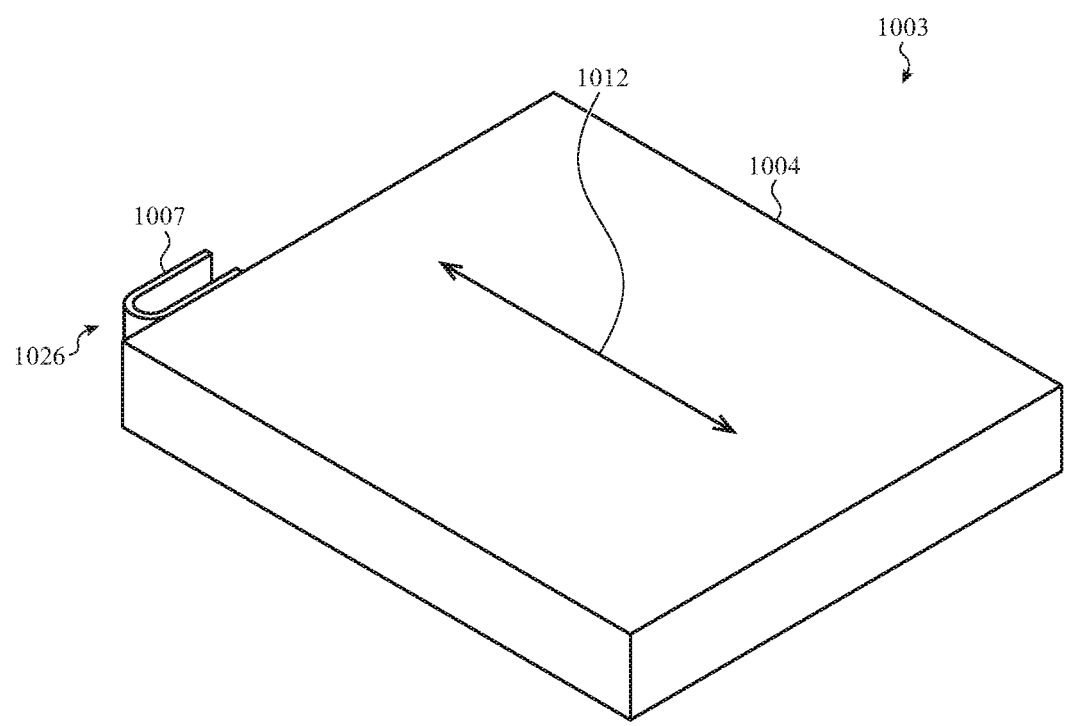
FIG. 10 depicts a ninth example haptic device.

FIG. 10 depicts a ninth example haptic device 1003. Similar to the haptic device 903, the haptic device 1003 includes a flexible connector 1007 formed of a flexible circuit cable coupled to a battery element 1004 moveable in one or more directions 1012. Unlike the haptic device 903, the bend 1026 in the flexible circuit cable in the haptic device 1003 may deform (bend and/or unbend) in the directions 1012 rather than acting as a pulley. Various configurations are possible and contemplated without departing from the scope of the present disclosure.

Figure 11:
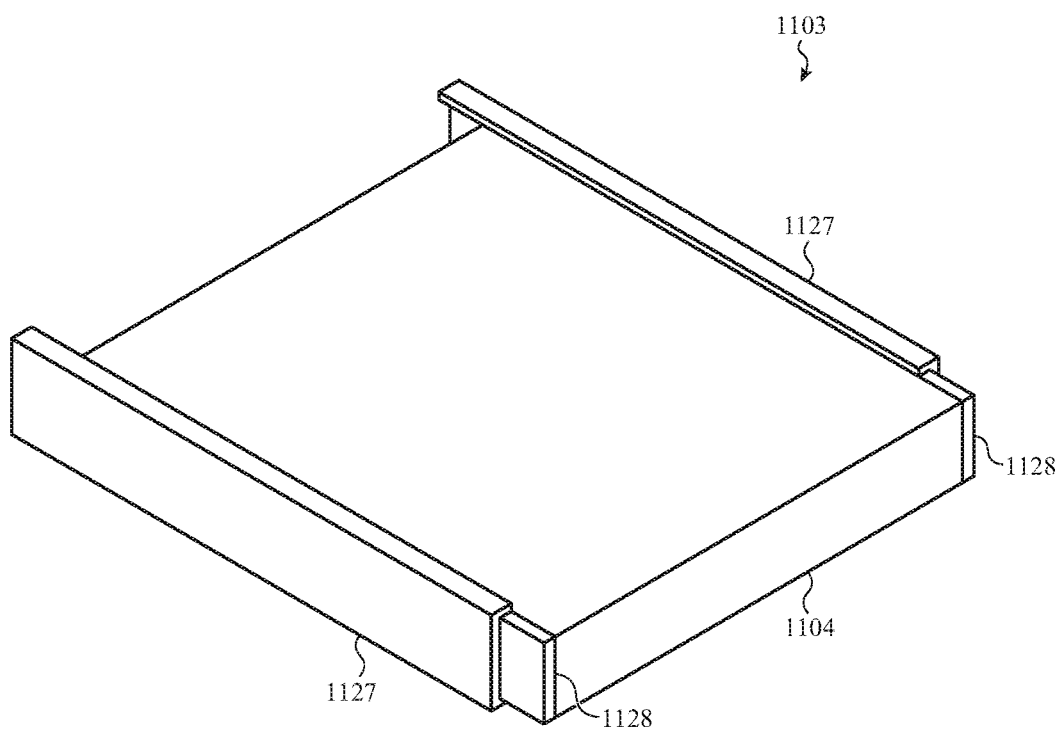
FIG. 11 depicts a tenth example haptic device.

FIG. 11 depicts a tenth example haptic device 1103. In this example, a battery element 1104 includes a set of electrical contact plates 1128 that are configured to electrically connect to electrical contact plates 1127. These pairs of electrical contact plates 1127, 1128 are configured to slide along each other and allow motion of the battery element 1104 while remaining electrically connected. Various configurations are possible and contemplated without departing from the scope of the present disclosure.

Figure 12:
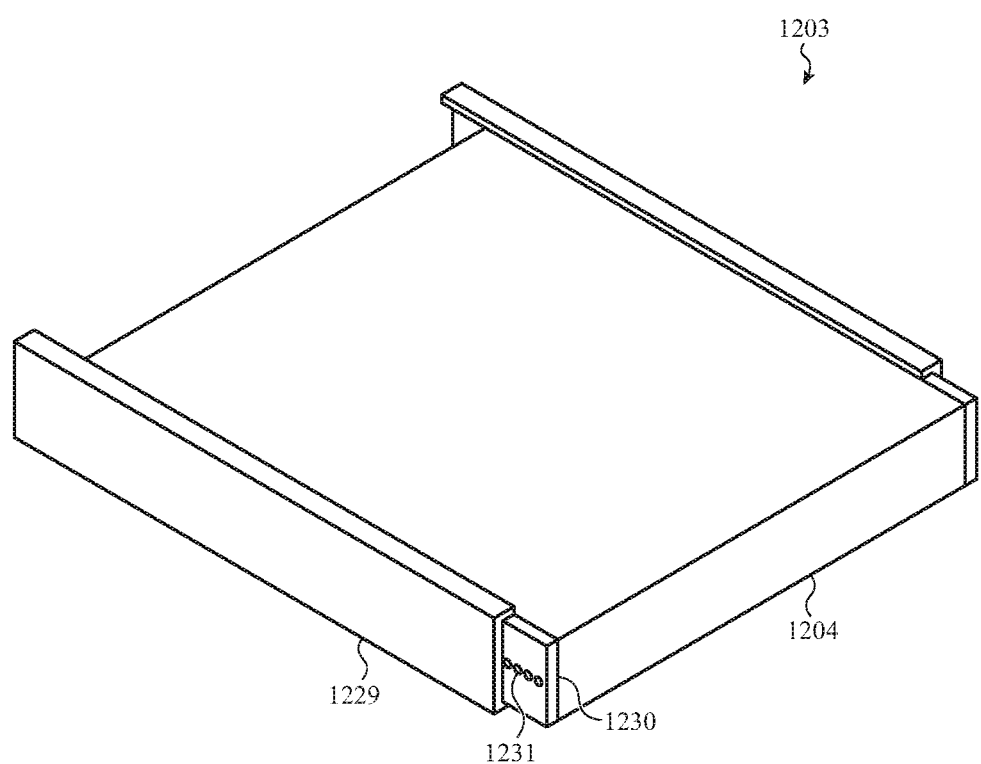
FIG. 12 depicts an eleventh example haptic device.

FIG. 12 depicts an eleventh example haptic device 1203. Similar to the haptic device 1103, the haptic device 1203 includes pairs of electrical contact plates 1229, 1230 that are configured to slide along each other and remain electrically connected while a battery element 1204 moves. By way of contrast with the haptic device 1103, the haptic device 1203 includes conductive ball bearings 1231 positioned between the pairs of electrical contact plates 1229, 1230. Various configurations are possible and contemplated without departing from the scope of the present disclosure.

Figure 13:
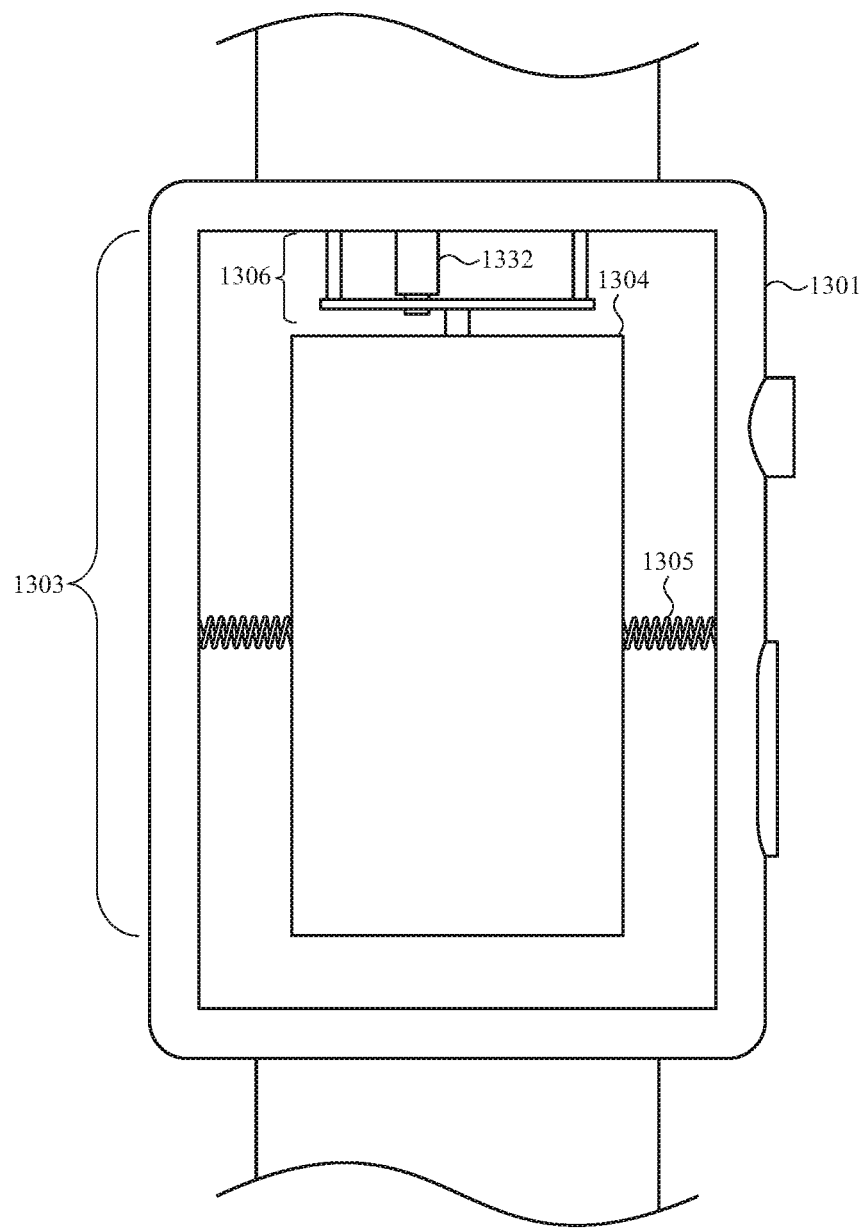
FIG. 13 depicts a twelfth example haptic device.

FIG. 13 depicts a twelfth example haptic device 1303. In this example, a battery element 1304 is moveably mounted to an enclosure 1301 using support mechanisms 1305. An actuation mechanism 1306 is operable to move the battery element 1304 by actuating a pulley system 1332 including a pulley driver that is connected to the battery element 1304 via a belt. Various configurations are possible and contemplated without departing from the scope of the present disclosure.

Figure 14:
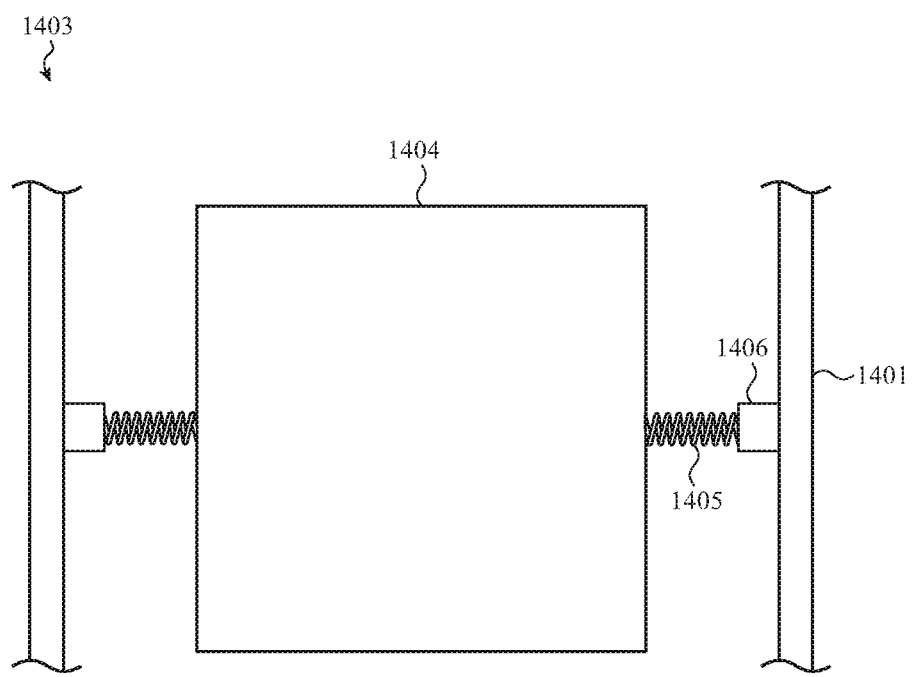
FIG. 14 depicts a thirteenth example haptic device.

FIG. 14 depicts a thirteenth example haptic device 1403. In this example, a battery element 1404 is supported between two piezoelectric elements 1406 by a pair of support mechanisms 1405. The two piezoelectric elements 1406 may be coupled to an enclosure 1401. Current may be applied to one or more of the piezoelectric elements 1406 to cause that piezoelectric element 1406 to deform toward and/or away from the battery element 1404. This may move the respective support mechanism 1405, producing an oscillatory movement of the battery element 1404. Various configurations are possible and contemplated without departing from the scope of the present disclosure.

Figure 15A:
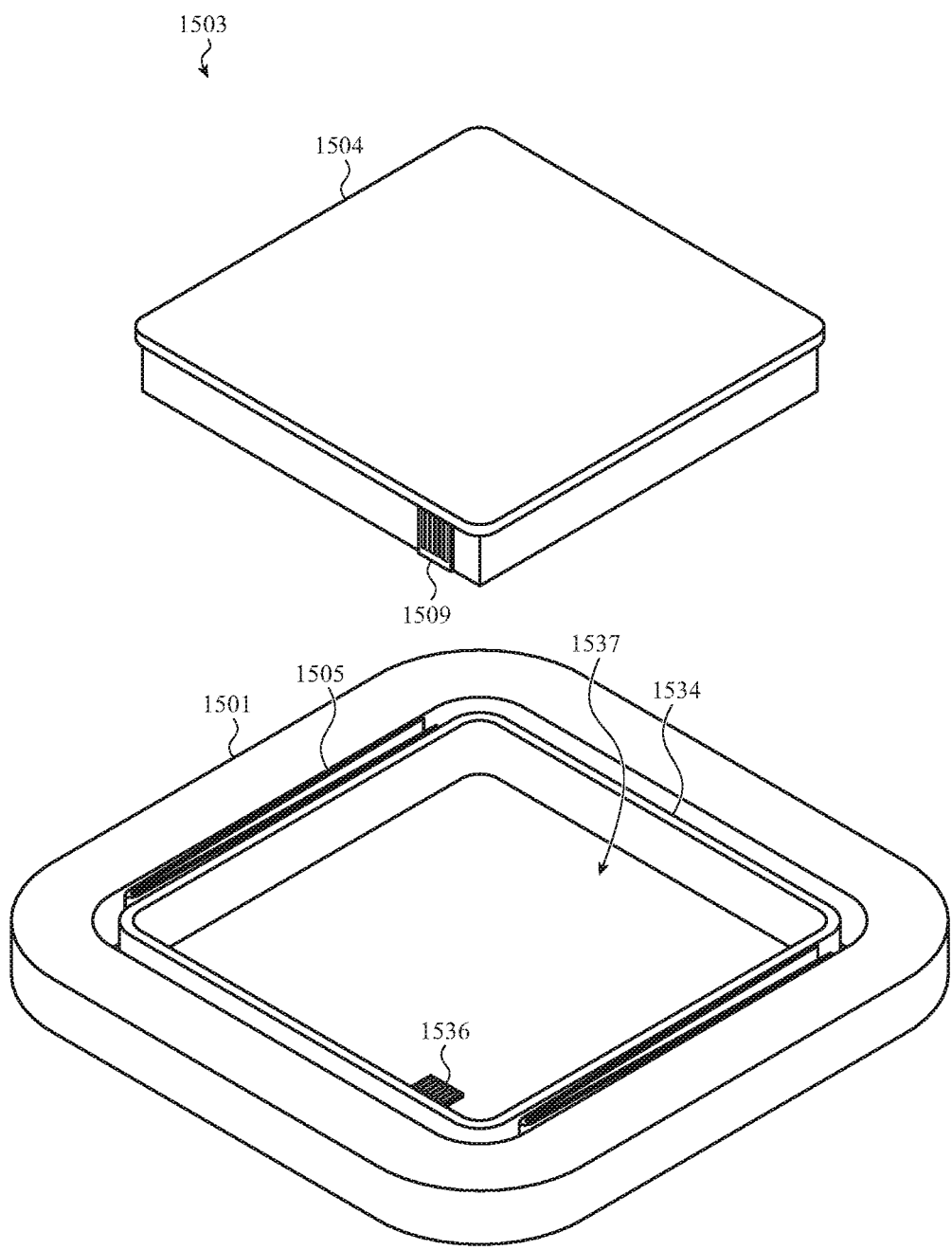
FIG. 15A depicts a fourteenth example haptic device.
Figure 15B:
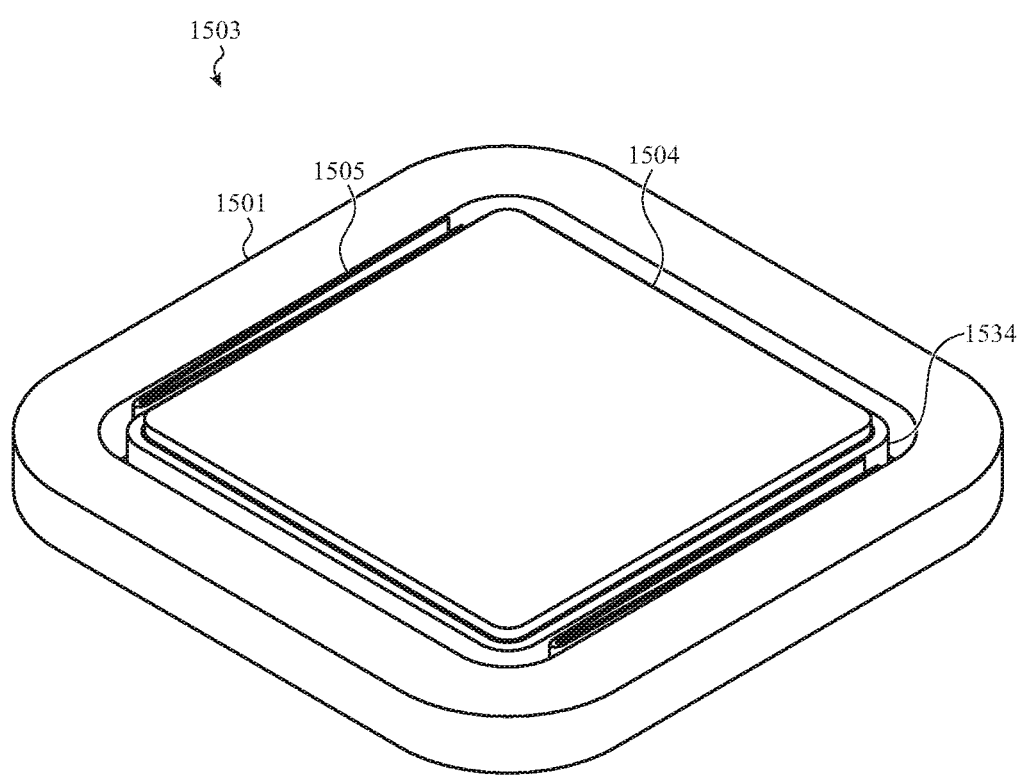
FIG. 15B depicts the haptic device of FIG. 15A with the battery element coupled to the retaining ring.

In several of the above examples, the described haptic devices may include battery elements that may be directly connected to the variously described actuation mechanisms, support mechanisms, and/or flexible connectors. In other examples, modular configurations may be used such that the battery elements may be removably coupled to such structures. For example, FIG. 15A depicts a fourteenth example haptic device 1503. In this example, a battery element 1504 may be coupled to an aperture 1537 of a tray 1534. The tray 1534 may be electrically and mechanically connected to other components (e.g., component 1501, which may be an enclosure for a watch, a frame within an enclosure, or any other suitable component) via conductive flexures 1505 that contact retaining ring terminals. The tray 1534 may include a connector 1536 that contacts a terminal 1509 of the battery element 1504 when the battery element 1504 is coupled to the aperture 1537 of the tray 1534. FIG. 15B depicts the haptic device 1503 of FIG. 15A with the battery element 1504 coupled to the tray 1534. In this way, the battery element 1504 may be removably coupled to other components via the terminal 1509, the connector 1536, the terminals of the tray 1534, and the conductive flexures 1505. Various configurations are possible and contemplated without departing from the scope of the present disclosure.

Although FIGS. 1A-1H illustrate and describe an electronic device 100 that may be an electronic watch having a display assembly 102 and a haptic device 103 with an actuation mechanism 106 that involves a coil assembly interacting with one or more magnetic elements, it is understood that this is an example. In other examples, other kinds of electronic devices that may or may not have displays and may use other kinds of force producing mechanisms for haptics without departing from the scope of the present disclosure.

Figure 16:
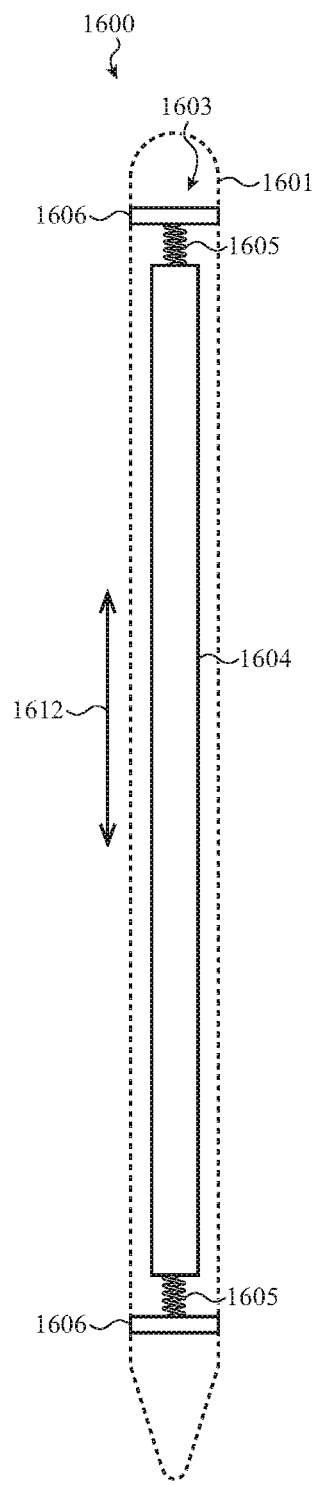
FIG. 16 depicts an internal view of alternative electronic device that includes a haptic device.

For example, FIG. 16 depicts an internal view of alternative electronic device 1600 that includes a haptic device 1603 disposed within a housing 1601. The haptic device 1603 may include a battery element 1604 coupled to an actuation mechanism 1606 by a support mechanism 1605. In this example, the electronic device 1600 may be a stylus or other electronic device that may not include a display. Further in this example, the support mechanism 1605 may be one or more springs and the actuation mechanism 1606 may be one or more piezoelectric elements that are coupled to the housing 1601. Current may be applied to one or more of the piezoelectric elements to cause that piezoelectric element to deform toward and/or away from the battery element 1604. This may move the support mechanism 1605, causing the battery element 1404 to move in one or more directions 1612. Various configurations are possible and contemplated without departing from the scope of the present disclosure.

The above illustrates and describes a number of embodiments. It is understood that these are examples. In various implementations, one or more features from one or more embodiments may be combined and/or used with one or more other embodiments. Various configurations are possible and contemplated without departing from the scope of the present disclosure.

In various implementations, an electronic watch may include an enclosure having a transparent cover defining a touch-sensitive surface, a display positioned within the enclosure and below the transparent cover, and a haptic device configured to produce a haptic output along the touch-sensitive surface. The haptic device may include a battery element electrically coupled to the display, a magnetic element, and a coil assembly fixed with respect to the enclosure and configured to induce an oscillatory movement of the battery element parallel to the display to produce the haptic output.

In some examples, the battery element may define a first surface and a second surface opposite to the first surface; the magnetic element may include a first magnetic element and a second magnetic element; the first magnetic element may be coupled to the battery element along the first surface and positioned between the battery element and the display; the second magnetic element may be coupled to the battery element along the second surface; and the coil assembly may extend around the battery element, the first magnetic element, and the second magnetic element. In various examples, the magnetic element may include a first magnetic element and a second magnetic element and the battery element may extend around at least a portion of the first magnetic element and at least a portion of the second magnetic element. In a number of examples, the first magnetic element and the second magnetic element may be disposed within the battery element.

In various examples, a current may be applied to the coil assembly from the battery element to induce the oscillatory movement. In some examples, the coil assembly may extend around the battery element. In a number of examples, the coil assembly may extend in a direction parallel to the battery element.

In some implementations, an electronic watch may include an enclosure having a transparent cover defining a touch-sensitive surface, a display positioned within the enclosure and below the transparent cover, and a haptic device configured to produce a haptic output along the touch-sensitive surface. The haptic device may include a battery element electrically coupled to the display, a magnetic element, and a coil assembly fixed with respect to the enclosure and configured to induce an oscillatory movement of the battery element in a direction that is parallel to at least a portion of the display to produce the haptic output.

In some examples, the battery element may define a first surface and a second surface opposite to the first surface, the magnetic element may include a first magnetic element and a second magnetic element, the first magnetic element may be coupled to the battery element along the first surface and positioned between the battery element and the display, the second magnetic element may be coupled to the battery element along the second surface, and the coil assembly may extend around the battery element, the first magnetic element, and the second magnetic element. In various examples, the magnetic element may include a first magnetic element and a second magnetic element and the battery element may extend around at least a portion of the first magnetic element and at least a portion of the second magnetic element. In some examples, the magnetic element may be a case of the battery element or the magnetic element may be a first magnetic element and a second magnetic element disposed in a cavity defined within the battery element. In a number of examples, the electronic watch may further include a drive circuit, the drive circuit may be configured to apply an oscillating current to the coil assembly, and the battery element may provide power to the drive circuit to produce the oscillating current.

In various examples, the haptic device may further include a first spring element positioned at a first end of the battery element and configured to produce a first restoring force and a second spring element positioned at a second end of the battery element opposite to the first end and configured to produce a second restoring force opposite to the first restoring force. In a number of such examples, the electronic watch may further include electronic circuitry having a processing unit, the electronic circuitry may be positioned along a side of the battery element that is opposite to the display, and the first spring element may be a flexible circuit element having one or more conductive power traces that electrically couple the battery element to the electronic circuitry.

In some implementations, an electronic watch may include an enclosure having a transparent cover, a touch-sensitive display positioned within the enclosure and below the transparent cover, and a haptic device configured to produce a haptic output along an exterior surface of the electronic watch. The haptic device may include a battery element electrically coupled to the touch-sensitive display, a first magnetic element fixed with respect to the enclosure, a second magnetic element fixed with respect to the enclosure, and a coil assembly fixed with respect to the battery element and configured to induce an oscillatory movement of the battery element parallel to at least a portion of the touch-sensitive display to produce the haptic output.

In various examples, the electronic watch may further include a drive circuit that is electrically coupled to the battery element and the drive circuit may be electrically coupled to the coil assembly and may be configured to produce a drive signal that induces the oscillatory movement of the battery element. In some examples, the haptic output may be produced in response to touch input detected by the touch-sensitive display and a graphical output of the touch-sensitive display may be modified in response to the touch input. In a number of examples, the oscillatory movement may produce a vibration that is tactilely perceptible along an outer surface of the transparent cover. In various examples, the oscillatory movement may produce an inertial pulse that is tactilely perceptible along an outer surface of the electronic watch. In a number of examples, the electronic watch may further include a circuit assembly positioned along a lower side of the battery element and the haptic device may further include a flexible electrical circuit that electrically connects the battery element to the circuit assembly. In some such examples, the flexible electrical circuit may be attached to a flexure element that may be configured to provide a restoring force to the battery element.

In a number of implementations, an electronic device may include an enclosure having a transparent cover, a touch sensor positioned below the transparent cover and configured to detect touch input along an outer surface of the transparent cover, a display positioned within the enclosure and below the transparent cover, a battery element disposed within the enclosure below the display, an actuation mechanism that is operable to move the battery element along a linear path that is parallel to a portion of the display to provide an inertial output that is tactilely perceptible along the outer surface of the transparent cover and a flexure that deforms in response to movement of the battery element and provides a restorative force to the battery element. The flexure may include a set of conductive traces that electrically connects the battery element to the display during the movement.

In some examples, the electronic device may be configured to cause the actuation mechanism to move the battery element in response to detecting the touch input along the outer surface of the transparent cover. In a number of examples, the electronic device may further include a circuit assembly positioned along a side of the battery element and the flexure may include a flexible metal substrate and a flexible circuit laminate disposed on the flexible metal substrate, the flexible circuit laminate including a set of conductive traces that electrically couples the battery element to the circuit assembly. In some such examples, the flexible circuit laminate may include multiple conductive traces.

In various examples, the flexure may include two straight segments that are connected by a joint and the joint may be configured to bend in response to the movement of the battery element. In some examples, the electronic device may further include a tray that is configured to receive the battery element, the tray may at least partially surround the battery element, and the tray may move with the battery element when the battery element is moved by the actuation mechanism.

Although a number of embodiments are illustrated and described above, it is understood that these are examples and are not intended to be limiting. In various implementations, features from one or more different embodiments may be variously combined without departing from the scope of the present disclosure. Numerous configurations are possible and contemplated.

As described above and illustrated in the accompanying figures, the present disclosure relates to a haptic device that moves a battery element. The haptic device may be included in an electronic device, such as an electronic watch. The haptic device may include the battery element, an actuation mechanism that is operable to move the battery element, a support mechanism that is operable to allow the battery element to move, and a flexible connector that electrically connects the battery element to another component during the movement.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:
1. An electronic watch comprising:
an enclosure having a transparent cover defining a touch-sensitive surface;
a display positioned within the enclosure and below the transparent cover; and
a haptic device configured to produce a haptic output along the touch-sensitive surface, the haptic device comprising:
a battery element electrically coupled to the display;
a magnetic element;
a coil assembly fixed with respect to the enclosure; and
a drive circuit configured to provide an oscillating current to the coil assembly, the oscillating current inducing an oscillatory movement of the magnetic element and the battery element in a direction parallel to at least a portion of the display, the movement of the magnetic element and the battery element producing the haptic output.

2. The electronic watch of claim 1, wherein:
the battery element defines a first surface and a second surface opposite to the first surface;
the magnetic element includes a first magnetic element and a second magnetic element;
the first magnetic element is coupled to the battery element along the first surface and positioned between the battery element and the display;
the second magnetic element is coupled to the battery element along the second surface; and
the coil assembly extends around the battery element, the first magnetic element, and the second magnetic element.

3. The electronic watch of claim 1, wherein:
the magnetic element includes a first magnetic element and a second magnetic element; and
the battery element extends around at least a portion of the first magnetic element and at least a portion of the second magnetic element.

4. The electronic watch of claim 1, wherein the magnetic element defines a case that at least partially encloses the battery element.

5. The electronic watch of claim 1, wherein:
the battery element is configured to provide power to the drive circuit to produce the oscillating current.

6. The electronic watch of claim 1, wherein the haptic device further comprises:
a first spring element positioned at a first end of the battery element and configured to produce a first restoring force; and
a second spring element positioned at a second end of the battery element opposite to the first end and configured to produce a second restoring force opposite to the first restoring force.

7. The electronic watch of claim 6, wherein:
the electronic watch further comprises electronic circuitry having a processing unit;
the electronic circuitry is positioned along a side of the battery element that is opposite to the display; and
the first spring element comprises a flexible circuit element having one or more conductive power traces that electrically couple the battery element to the electronic circuitry.

8. An electronic watch comprising:
an enclosure having a transparent cover;
a touch-sensitive display positioned within the enclosure and below the transparent cover; and
a haptic device configured to produce a haptic output along an exterior surface of the electronic watch, the haptic device comprising:
  a battery element electrically coupled to the touch-sensitive display;
  a first magnetic element fixed with respect to the enclosure;
  a second magnetic element fixed with respect to the enclosure;
  a coil assembly fixed with respect to the battery element; and
  a drive circuit configured to provide an oscillatory current to the coil assembly, the oscillating current inducing an oscillatory movement of the coil assembly and the battery element with respect to the first magnetic element and the second magnetic element to produce the haptic output.

9. The electronic watch of claim 8, wherein:
the drive circuit is electrically coupled to the battery element.

10. The electronic watch of claim 8, wherein:
the electronic watch is configured to produce the haptic output in response to touch input detected by the touch-sensitive display; and
the electronic watch is configured to modify a graphical output of the touch-sensitive display in response to the touch input.

11. The electronic watch of claim 8, wherein the oscillatory movement produces a vibration that is tactilely perceptible along an outer surface of the transparent cover.

12. The electronic watch of claim 8, wherein the oscillatory movement produces an inertial pulse that is tactilely perceptible along an outer surface of the electronic watch.

13. The electronic watch of claim 8, wherein:
the electronic watch further comprises a circuit assembly positioned along a lower side of the battery element; and
the haptic device further comprises a flexible electrical circuit that electrically connects the battery element to the circuit assembly.

14. The electronic watch of claim 13, wherein the flexible electrical circuit is attached to a flexure element that is configured to provide a restoring force to the battery element.

15. An electronic device comprising:
an enclosure having a transparent cover;
a touch sensor positioned below the transparent cover and configured to detect touch input along an outer surface of the transparent cover;
a display positioned within the enclosure and below the transparent cover;
a battery element disposed within the enclosure below the display;
an actuation mechanism that is operable to move the battery element along a linear path thereby providing an inertial output that is tactilely perceptible along the outer surface of the transparent cover; and
a pair of flexures that deform in response to movement of the battery element and provide a restorative force to the battery element, the pair of flexures including a first flexure disposed between a first side of the battery element and the enclosure and a second flexure disposed between a second side of the battery element and the enclosure, the first flexure including a set of conductive traces that electrically connects the battery element to the display during the movement.

16. The electronic device of claim 15, wherein the electronic device is configured to cause the actuation mechanism to move the battery element in response to detecting the touch input along the outer surface of the transparent cover.

17. The electronic device of claim 15, wherein:
the electronic device further comprises a circuit assembly positioned along a side of the battery element; and
the first flexure comprises:
a flexible metal substrate; and
a flexible circuit laminate disposed on the flexible metal substrate, the flexible circuit laminate including a set of conductive traces that electrically couples the battery element to the circuit assembly.

18. The electronic device of claim 17, wherein the flexible circuit laminate includes multiple conductive traces.

19. The electronic device of claim 15, wherein:
the first flexure includes two straight segments that are connected by a joint; and
the joint is configured to bend in response to the movement of the battery element.

20. The electronic device of claim 15, wherein:
the electronic device further comprises a tray that is configured to receive the battery element;
the tray at least partially surrounds the battery element; and
the tray moves with the battery element when the battery element is moved by the actuation mechanism.

* * * * *